US012080896B2

United States Patent
Sato et al.

(10) Patent No.: US 12,080,896 B2
(45) Date of Patent: Sep. 3, 2024

(54) CARBON CATALYST, BATTERY ELECTRODE, AND BATTERY

(71) Applicant: NISSHINBO HOLDINGS INC., Tokyo (JP)

(72) Inventors: Tetsutaro Sato, Kisarazu (JP); Yuji Kubota, Chiba (JP); Takeaki Kishimoto, Funabashi (JP); Kumi Narizuka, Koga (JP); Koji Kamata, Chiba (JP); Yoshikazu Kobayashi, Chiba (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 99 days.

(21) Appl. No.: 17/834,333

(22) Filed: Jun. 7, 2022

(65) Prior Publication Data

US 2022/0302469 A1  Sep. 22, 2022

Related U.S. Application Data

(63) Continuation of application No. 16/629,533, filed as application No. PCT/JP2018/025250 on Jul. 3, 2018, now Pat. No. 11,387,466.

(30) Foreign Application Priority Data

Jul. 13, 2017 (JP) .................... 2017-137458

(51) Int. Cl.
  *H01M 4/96* (2006.01)
  *H01M 12/08* (2006.01)
(52) U.S. Cl.
  CPC ............. *H01M 4/96* (2013.01); *H01M 12/08* (2013.01)

(58) Field of Classification Search
  CPC ........ H01M 4/96; H01M 12/08; H01M 12/06; H01M 2008/1095; H01M 4/9091;
  (Continued)

(56) References Cited

U.S. PATENT DOCUMENTS

| 2008/0118649 A1* | 5/2008 | Rathenow | A61L 31/084 |
| | | | 427/255.28 |
| 2016/0104900 A1* | 4/2016 | Imashiro | H01M 4/926 |
| | | | 429/405 |

(Continued)

FOREIGN PATENT DOCUMENTS

| CN | 106232226 A | 12/2016 |
| EP | 3 466 537 A1 | 4/2019 |

(Continued)

OTHER PUBLICATIONS

Sep. 18, 2018 International Search Report issued in International Patent Application No. PCT/JP2018/025250.

(Continued)

*Primary Examiner* — Daniel S Gatewood
(74) *Attorney, Agent, or Firm* — Oliff PLC

(57) ABSTRACT

A carbon catalyst has a carbon structure with a crystallite size Lc falling within 0.90 nm or more and 1.20 nm or less calculated through use of a Bragg angle of a diffraction peak $f_{broad}$ at a diffraction angle $2\theta$ of $24.0°\pm4.0°$ obtained by separating a diffraction peak in the vicinity of a diffraction angle $2\theta$ of $26°$ in an X-ray diffraction pattern obtained by powder X-ray diffraction using a CuKα ray, and a carbon dioxide desorption amount from 650° C. to 1,200° C. of 97 μmol/g or less, a total of a carbon monoxide desorption amount and a carbon dioxide desorption amount from 650° C. to 1,200° C. of 647 μmol/g or less, or a carbon monoxide desorption amount from 650° C. to 1,200° C. of 549 μmol/g or less in a temperature programmed desorption method (Continued)

including measuring a carbon dioxide desorption amount from 25° C. to 1,200° C.

17 Claims, 9 Drawing Sheets

(58) Field of Classification Search
CPC .. Y02E 60/50; B01J 21/18; B01J 27/24; B01J 35/10; C01B 32/00
See application file for complete search history.

(56) References Cited

U.S. PATENT DOCUMENTS

| | | |
|---|---|---|
| 2016/0118199 A1 | 4/2016 | Okuno et al. |
| 2017/0117555 A1 | 4/2017 | Kishida et al. |
| 2017/0187041 A1 | 6/2017 | Yamada et al. |
| 2017/0194653 A1 | 7/2017 | Imashiro et al. |
| 2018/0013146 A1 | 1/2018 | Yamada et al. |
| 2018/0069247 A1 | 3/2018 | Iijima et al. |
| 2020/0036013 A1 | 1/2020 | Imashiro et al. |

FOREIGN PATENT DOCUMENTS

| | | | |
|---|---|---|---|
| JP | 2007-207662 A | | 8/2007 |
| JP | 2015164889 A | * | 9/2015 |
| JP | 2016-105396 A | | 6/2016 |
| WO | 2015/182138 A1 | | 12/2015 |
| WO | 2016/088716 A1 | | 6/2016 |
| WO | 2016/133132 A1 | | 8/2016 |
| WO | 2017/209244 A1 | | 12/2017 |

OTHER PUBLICATIONS

Calvillo et al., "Comparative study of Pt catalysts supported on different high conductive carbon materials for methanol and ethanol oxidation," Electrochimica Acta, 2013, vol. 102, pp. 19-27.
Mar. 16, 2021 Extended Search Report issued in European Patent Application No. 18831901.6.

* cited by examiner

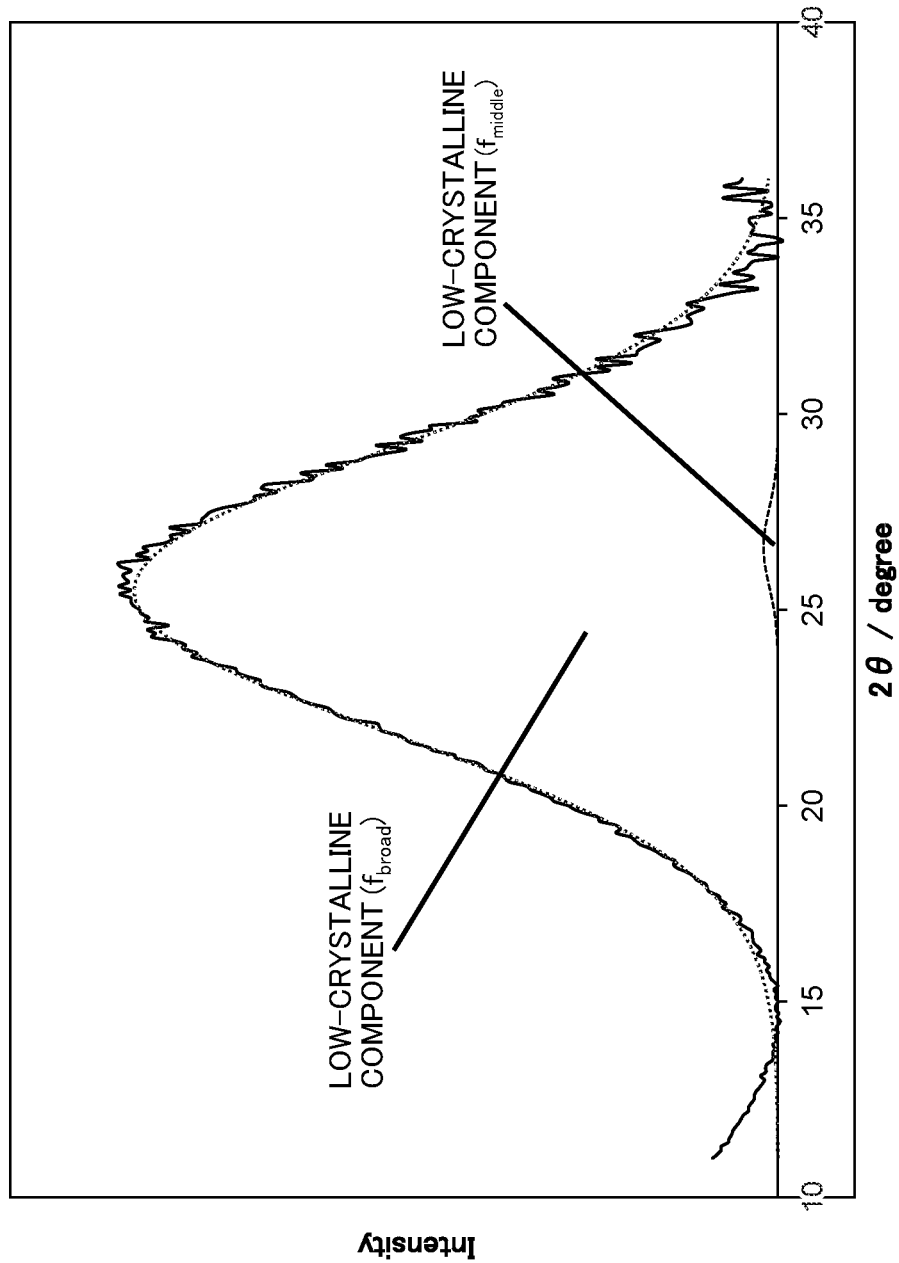

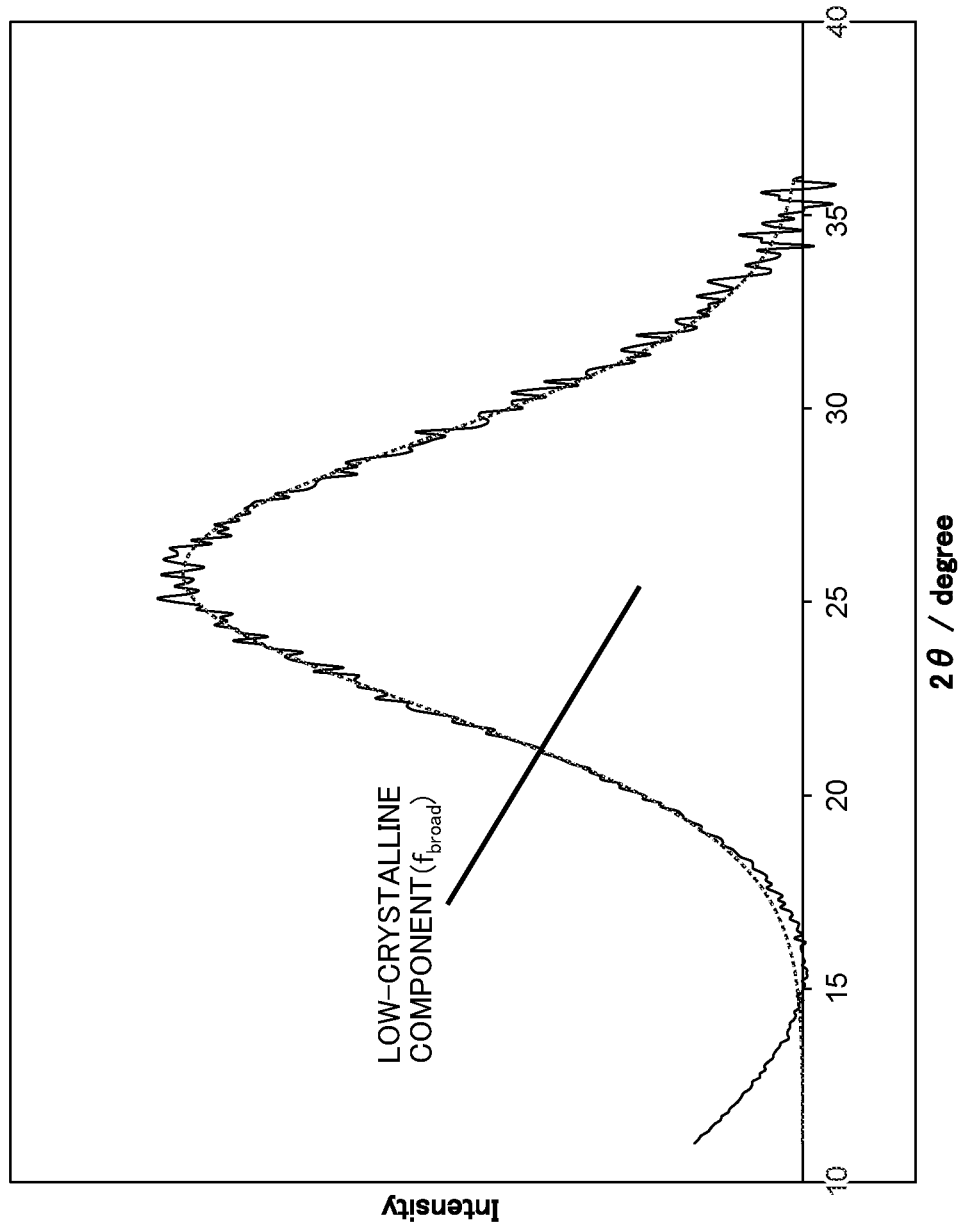

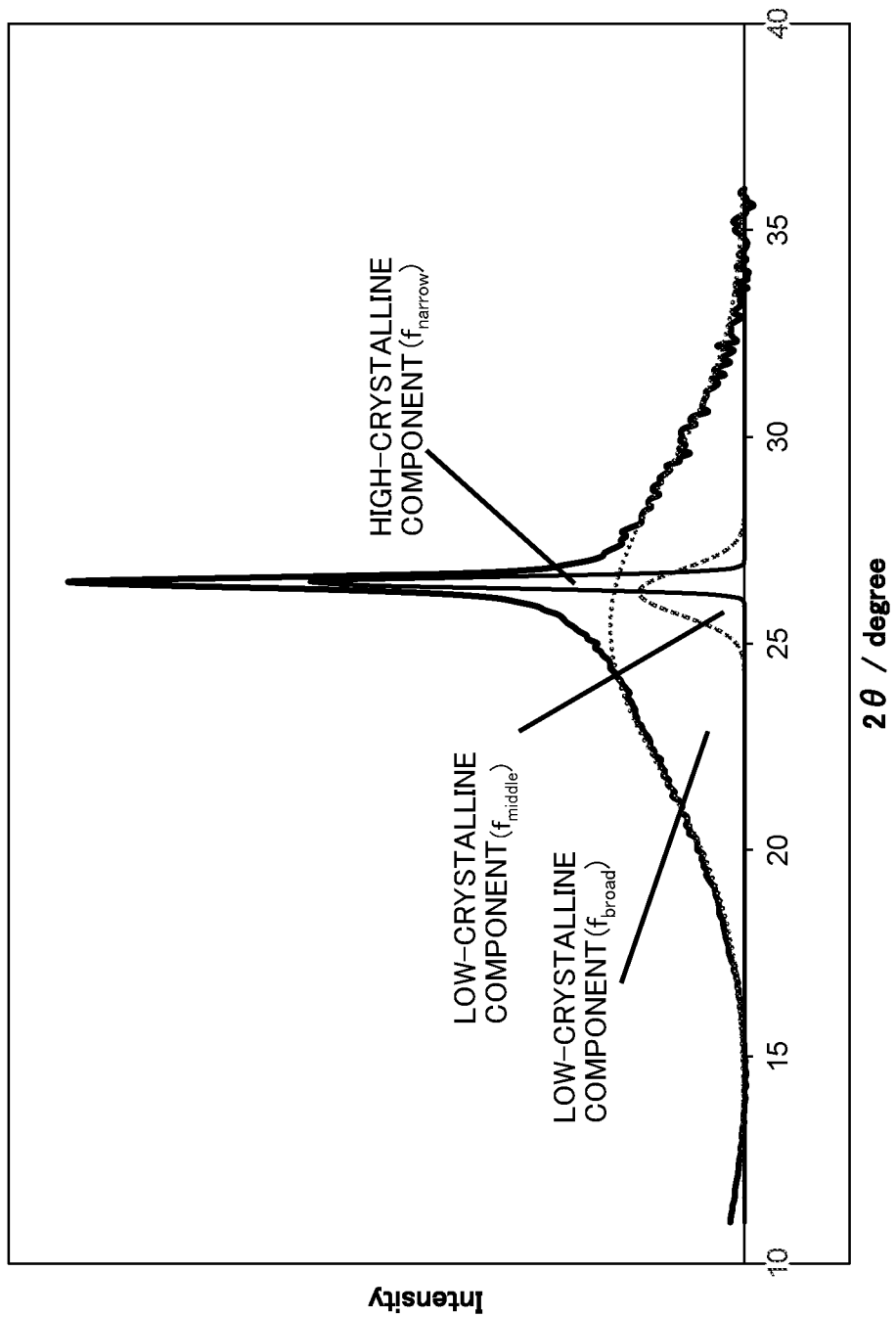

FIG.5

| | CATALYTIC ACTIVITY | | DURABILITY | | XRD | TPD DESORPTION AMOUNT ($\mu$mol/g) | | | | RAMAN SPECTROSCOPY | | | BET SPECIFIC SURFACE AREA ($m^2/g$) |
|---|---|---|---|---|---|---|---|---|---|---|---|---|---|
| | $E_{O2}$ (V) | $i_{0.7}$ (mA/$cm^2$) | $i_{0.7}$ MAINTENANCE RATIO (%) | CV AREA INCREASE AMOUNT (A·sec) | Lc (nm) | CO | $CO_2$ | $CO+CO_2$ | $I_V/I_g$ RATIO | D BAND HALF WIDTH ($cm^{-1}$) | G BAND HALF WIDTH ($cm^{-1}$) | |
| EXAMPLE 1 | 0.831 | -1.70 | 90.6 | 5.25E-05 | 1.00 | 533 | 85 | 618 | 0.47 | 179 | 80 | 1232 |
| EXAMPLE 2 | 0.829 | -1.68 | 92.3 | 4.81E-05 | 1.04 | 55 | 12 | 67 | 0.44 | 177 | 73 | 1549 |
| EXAMPLE 3 | 0.830 | -1.70 | 91.8 | 4.96E-05 | 1.05 | 203 | 54 | 257 | 0.31 | 134 | 56 | 1680 |
| EXAMPLE 4 | 0.830 | -1.63 | 92.6 | 4.79E-05 | 0.98 | 542 | 9 | 552 | 0.40 | 160 | 68 | 1280 |
| EXAMPLE 5 | 0.828 | -1.57 | 92.4 | 4.80E-05 | 1.01 | 480 | 40 | 520 | 0.48 | 177 | 78 | 1250 |
| EXAMPLE 6 | 0.835 | -1.75 | 93.7 | 4.74E-05 | 1.05 | 53 | 11 | 64 | 0.42 | 170 | 70 | 1530 |
| EXAMPLE 7 | 0.837 | -1.80 | 92.8 | 4.78E-05 | 1.10 | 190 | 48 | 238 | 0.32 | 130 | 55 | 1660 |
| EXAMPLE 8 | 0.834 | -1.75 | 93.1 | 4.77E-05 | 1.02 | 54 | 10 | 64 | 0.45 | 178 | 73 | 1535 |
| EXAMPLE 9 | 0.833 | -1.74 | 93.7 | 4.74E-05 | 1.02 | 52 | 10 | 62 | 0.45 | 178 | 73 | 1540 |
| EXAMPLE 10 | 0.828 | -1.65 | 92.1 | 4.82E-05 | 1.04 | 57 | 14 | 71 | 0.44 | 177 | 73 | 1545 |
| EXAMPLE 11 | 0.827 | -1.64 | 92.1 | 4.82E-05 | 1.11 | 60 | 15 | 75 | 0.43 | 175 | 70 | 1520 |
| EXAMPLE 12 | 0.829 | -1.68 | 92.3 | 4.81E-05 | 1.05 | 59 | 15 | 74 | 0.43 | 175 | 70 | 1525 |
| EXAMPLE 13 | 0.830 | -1.70 | 92.3 | 4.81E-05 | 1.03 | 54 | 10 | 64 | 0.46 | 179 | 75 | 1560 |
| EXAMPLE 14 | 0.826 | -1.65 | 92.1 | 4.82E-05 | 1.13 | 57 | 14 | 71 | 0.43 | 175 | 70 | 1530 |
| EXAMPLE 15 | 0.827 | -1.63 | 92.0 | 4.83E-05 | 1.04 | 56 | 11 | 67 | 0.44 | 177 | 73 | 1532 |
| EXAMPLE 16 | 0.830 | -1.69 | 92.3 | 4.81E-05 | 1.04 | 55 | 11 | 66 | 0.44 | 177 | 73 | 1535 |
| EXAMPLE 17 | 0.826 | -1.67 | 92.2 | 4.82E-05 | 1.05 | 57 | 13 | 70 | 0.42 | 170 | 70 | 1525 |
| COMPARATIVE EXAMPLE 1 | 0.827 | -1.71 | 87.1 | 6.42E-05 | 1.00 | 2294 | 228 | 2521 | 0.52 | 197 | 85 | 1371 |
| COMPARATIVE EXAMPLE 2 | 0.803 | -0.95 | 92.9 | 5.87E-05 | 1.25 | 552 | 101 | 653 | 0.50 | 180 | 81 | 1347 |
| COMPARATIVE EXAMPLE 3 | 0.828 | -1.72 | 87.8 | 6.37E-05 | 1.01 | 2150 | 200 | 2350 | 0.53 | 190 | 87 | 1360 |
| COMPARATIVE EXAMPLE 4 | 0.804 | -0.97 | 93.8 | 5.81E-05 | 1.24 | 550 | 98 | 648 | 0.55 | 185 | 85 | 1332 |

FIG.6

| AIR CELL | POSITIVE ELECTRODE | NEGATIVE ELECTRODE | MAXIMUM OUTPUT DENSITY [mW/cm$^2$] |
|---|---|---|---|
| ZINC AIR CELL | CARBON CATALYST | ZINC | 119 |
| | CARBON BLACK | | 79 |
| MAGNESIUM AIR CELL | CARBON CATALYST | MAGNESIUM | 104 |
| | CARBON BLACK | | 65 |

FIG. 7

| AIR CELL | POSITIVE ELECTRODE | NEGATIVE ELECTRODE | OUTPUT MAINTENANCE RATIO [%] |
|---|---|---|---|
| ZINC AIR CELL | CARBON CATALYST | ZINC | 91 |
| | CARBON BLACK | | 34 |
| MAGNESIUM AIR CELL | CARBON CATALYST | MAGNESIUM | 89 |
| | CARBON BLACK | | 37 | de# CARBON CATALYST, BATTERY ELECTRODE, AND BATTERY

RELATED APPLICATIONS

The present application is a continuation application of U.S. application Ser. No. 16/629,533 filed Jan. 8, 2020, which in turn is a U.S. national stage application of PCT/JP2018/025250 filed Jul. 3, 2018. Each of these prior applications is incorporated by reference in its entirety.

TECHNICAL FIELD

The present invention relates to a carbon catalyst, a battery electrode, and a battery.

BACKGROUND ART

Currently, as a catalyst for an electrode of a fuel cell, a platinum catalyst is used. However, there are many problems to be solved. For example, the reserves of platinum are limited. In a polymer electrolyte fuel cell (PEFC), the use of platinum increases cost. Therefore, an alternative technology that does not use platinum has been developed.

Specifically, for example, in Patent Literature 1, there is described an electrode catalyst for a fuel cell, which is formed of a carbonized material obtained by carbonizing an ion exchange resin containing a transition metal, and in which many carbon particles each having a shell-like structure with an average particle diameter of from 10 nm to 20 nm assemble in a non-aggregated state.

CITATION LIST

Patent Literature

[PTL 1] JP 2007-207662 A

SUMMARY OF INVENTION

Technical Problem

However, it has hitherto been difficult to obtain a carbon catalyst having excellent catalytic activity and excellent durability.

The present invention has been made in view of the above-mentioned problem, and one of the objects of the present invention is to provide a carbon catalyst, a battery electrode, and a battery each having excellent catalytic activity and excellent durability.

Solution to Problem

In order to solve the above-mentioned problem, in one aspect, a carbon catalyst according to one embodiment of the present invention includes a carbon structure that has a crystallite size Lc falling within a range of 0.80 nm or more and 1.20 nm or less calculated through use of a Bragg angle of a diffraction peak $f_{broad}$ at a diffraction angle $2\theta$ of $24.0°\pm4.0°$ obtained by separating a diffraction peak in a vicinity of a diffraction angle $2\theta$ of 26° in an X-ray diffraction pattern obtained by powder X-ray diffraction using a CuKα ray, and that exhibits a carbon dioxide desorption amount in the temperature range from 650° C. to 1,200° C. of 97 μmol/g or less in a temperature programmed desorption method including measuring a carbon dioxide desorption amount in the temperature range from 25° C. to 1,200° C. According to the one embodiment of the present invention, a carbon catalyst having excellent catalytic activity and excellent durability is provided.

In order to solve the above-mentioned problem, in another aspect, the carbon catalyst according to the one embodiment of the present invention includes a carbon structure that has a crystallite size Lc falling within a range of 0.80 nm or more and 1.20 nm or less calculated through use of a Bragg angle of a diffraction peak $f_{broad}$ at a diffraction angle $2\theta$ of $24.0°\pm4.0°$ obtained by separating a diffraction peak in a vicinity of a diffraction angle $2\theta$ of 26° in an X-ray diffraction pattern obtained by powder X-ray diffraction using a CuKα ray, and that exhibits a total of a carbon monoxide desorption amount and a carbon dioxide desorption amount in the temperature range from 650° C. to 1,200° C. of 647 μmol/g or less in a temperature programmed desorption method including measuring a carbon monoxide desorption amount and a carbon dioxide desorption amount in the temperature range from 25° C. to 1,200° C. According to the one embodiment of the present invention, a carbon catalyst having excellent catalytic activity and excellent durability is provided.

In order to solve the above-mentioned problem, in a still another aspect, the carbon catalyst according to the one embodiment of the present invention includes a carbon structure that has a crystallite size Lc falling within a range of 0.80 nm or more and 1.20 nm or less calculated through use of a Bragg angle of a diffraction peak $f_{broad}$ at a diffraction angle $2\theta$ of $24.0°\pm4.0°$ obtained by separating a diffraction peak in a vicinity of a diffraction angle $2\theta$ of 26° in an X-ray diffraction pattern obtained by powder X-ray diffraction using a CuKα ray, and that exhibits a carbon monoxide desorption amount in the temperature range from 650° C. to 1,200° C. of 549 μmol/g or less in a temperature programmed desorption method including measuring a carbon monoxide desorption amount in the temperature range from 25° C. to 1,200° C. According to the one embodiment of the present invention, a carbon catalyst having excellent catalytic activity and excellent durability is provided.

In addition, the carbon catalyst may include the carbon structure that exhibits a total of a carbon monoxide desorption amount and a carbon dioxide desorption amount in the temperature range from 650° C. to 1,200° C. of 647 μmol/g or less in the temperature programmed desorption method including measuring a carbon monoxide desorption amount and a carbon dioxide desorption amount in the temperature range from 25° C. to 1,200° C. In addition, the carbon catalyst may include the carbon structure that exhibits a carbon monoxide desorption amount in the temperature range from 650° C. to 1,200° C. of 549 μmol/g or less in the temperature programmed desorption method including measuring a carbon monoxide desorption amount in the temperature range from 25° C. to 1,200° C.

In addition, the carbon catalyst may include the carbon structure that exhibits a ratio of a minimum intensity between a G band in a vicinity of 1,580 $cm^{-1}$ and a D band in a vicinity of 1,360 $cm^{-1}$ to an intensity of the G band of 0.30 or more and 0.49 or less in a Raman spectrum obtained by Raman spectroscopy. In addition, the carbon catalyst may include the carbon structure that exhibits a half width of a D band in a vicinity of 1,360 $cm^{-1}$ of 179 $cm^{-1}$ or less in a Raman spectrum obtained by Raman spectroscopy. In addition, the carbon catalyst may include the carbon structure that exhibits a half width of a G band in a vicinity of 1,580 $cm^{-1}$ of 80 $cm^{-1}$ or less in a Raman spectrum obtained by Raman spectroscopy.

In addition, the carbon catalyst may include a metal. In addition, the carbon catalyst may include the carbon structure that has a specific surface area of 800 m$^2$/g or more measured by a BET method. In addition, the carbon catalyst may include the carbon structure that exhibits a ratio of a nitrogen atom concentration to a carbon atom concentration of 2.0% or more, the nitrogen atom concentration and the carbon atom concentration being measured by X-ray photoelectron spectroscopy. In addition, the carbon catalyst may include the carbon structure that has a nitrogen atom content of 1.5 wt % or more measured by elemental analysis based on a combustion method.

In addition, the carbon catalyst may exhibit a voltage of 0.810 V (vs. NHE) or more at a time when a reduction current of −10 µA/cm$^2$ flows in an oxygen reduction voltammogram obtained by performing sweep application of a potential through use of a rotating ring disk electrode device including a working electrode containing the carbon catalyst. In addition, the carbon catalyst may exhibit a current density of −1.0 mA/cm$^2$ or less at a time when a voltage of 0.7 V (vs. NHE) is applied in an oxygen reduction voltammogram obtained by performing sweep application of a potential through use of a rotating ring disk electrode device including a working electrode containing the carbon catalyst.

In addition, regarding an area of a region enclosed by a curve at a time of sweep application of a potential of from 1.0 V to 0.0 V and a curve at a time of sweep application of a potential of from 0.0 V to 1.0 V in a voltammogram at a fifth cycle, the voltammogram being obtained by performing sweep application of a potential for five cycles within a range of from 0.0 V to 1.0 V (vs. NHE) through use of a rotating ring disk electrode device including a working electrode containing the carbon catalyst at each of a time of start and a time of end of a durability test in which a state of applying a voltage of 1.2 V (vs. RHE) is kept for 10 minutes through use of the rotating ring disk electrode device, the carbon catalyst may exhibit an area increase amount of 5.70×10$^{-5}$ A·sec or less, the area increase amount being obtained by subtracting the area at the time of ending of the durability test from the area at the time of starting of the durability test.

In addition, regarding a current density (mA/cm$^2$) at a time when a voltage of 0.7 V (vs. NHE) is applied in an oxygen reduction voltammogram obtained by performing sweep application of a potential through use of a rotating ring disk electrode device including a working electrode containing the carbon catalyst at each of a time of start and a time of end of a durability test in which a state of applying a voltage of 1.2 V (vs. RHE) is kept for 10 minutes through use of the rotating ring disk electrode device, the carbon catalyst may exhibit a current density maintenance ratio of 88.0% or more, the current density maintenance ratio being obtained by multiplying a value, which is obtained by dividing the current density at a time of the end of the durability test by the current density at a time of the start of the durability test, by 100.

In order to solve the above-mentioned problem, a battery electrode according to one embodiment of the present invention includes anyone of the above-mentioned carbon catalysts. According to the one embodiment of the present invention, a battery electrode including the carbon catalyst having excellent catalytic activity and excellent durability is provided.

In order to solve the above-mentioned problem, a battery according to one embodiment of the present invention includes the above-mentioned battery electrode. According to the one embodiment of the present invention, a battery including the carbon catalyst having excellent catalytic activity and excellent durability is provided.

Advantageous Effects of Invention

According to the present invention, a carbon catalyst, a battery electrode, and a battery each having excellent catalytic activity and excellent durability are provided.

BRIEF DESCRIPTION OF DRAWINGS

FIG. 1A is an explanatory diagram for showing a result obtained by separating a diffraction peak in an X-ray diffraction pattern obtained by powder X-ray diffraction of a carbon catalyst obtained in Example 1 according to one embodiment of the present invention.

FIG. 1B is an explanatory diagram for showing a result obtained by separating a diffraction peak in an X-ray diffraction pattern obtained by powder X-ray diffraction of a carbon catalyst obtained in Example 2 according to one embodiment of the present invention.

FIG. 1C is an explanatory diagram for showing one example of a result obtained by separating a diffraction peak in an X-ray diffraction pattern obtained by powder X-ray diffraction of a carbon catalyst.

FIG. 5 is an explanatory diagram for showing results obtained by evaluating carbon catalysts obtained in Examples 1 to 17 according to one embodiment of the present invention and Comparative Examples 1 to 4.

FIG. 6 is an explanatory diagram for showing results obtained by evaluating a maximum output density of an air cell of an Example according to one embodiment of the present invention.

FIG. 7 is an explanatory diagram for showing results obtained by evaluating an output maintenance ratio of the air cell of the Example according to the one embodiment of the present invention.

DESCRIPTION OF EMBODIMENTS

Figure 2:
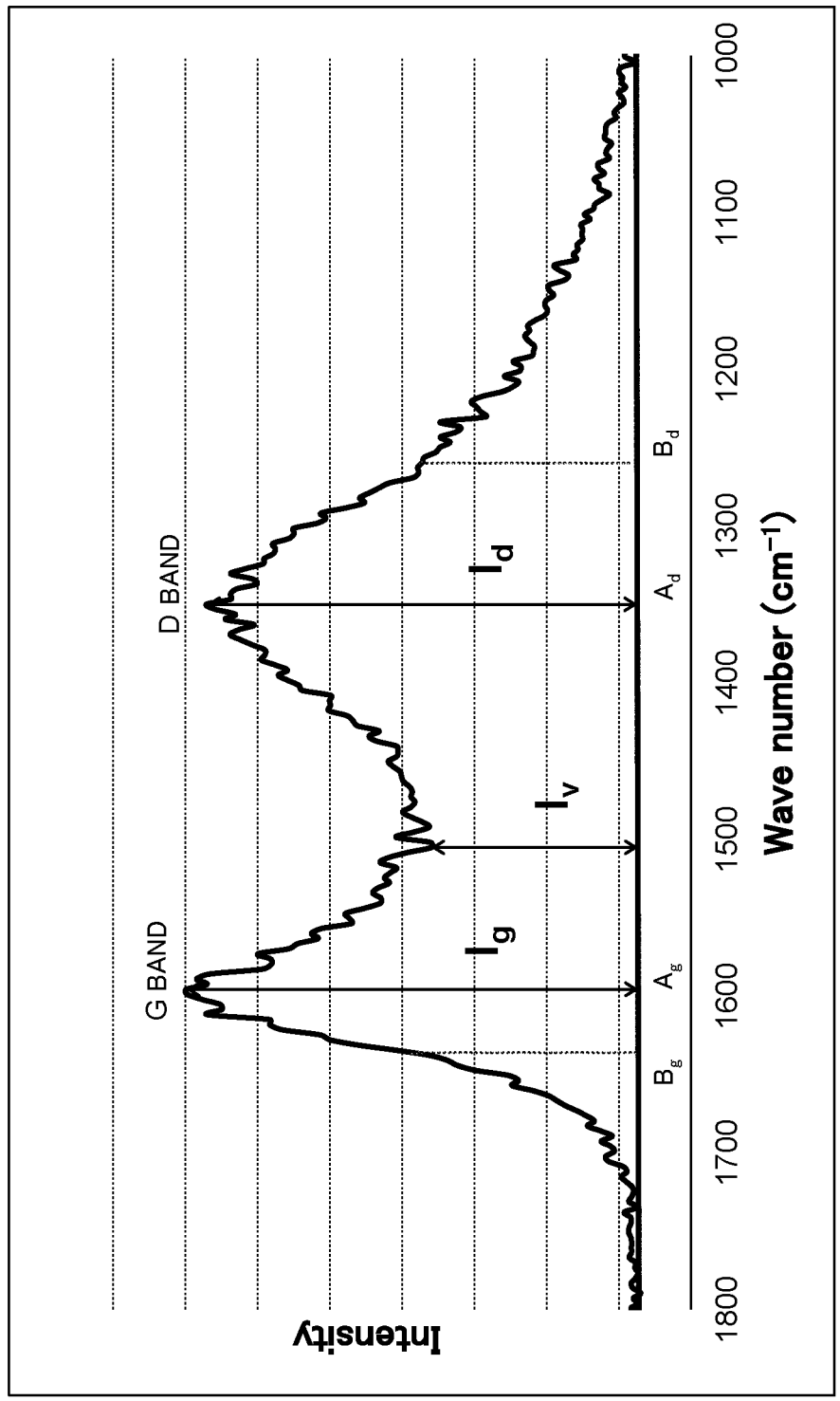
FIG. 2 is an explanatory diagram for showing a result obtained by analyzing a Raman spectrum obtained by Raman spectroscopy of the carbon catalyst obtained in Example 1 according to the one embodiment of the present invention.

Now, a carbon catalyst according to one embodiment of the present invention (hereinafter referred to as "catalyst of the present invention"), a battery electrode according to one embodiment of the present invention (hereinafter referred to as "electrode of the present invention"), and a battery according to one embodiment of the present invention (hereinafter referred to as "battery of the present invention")

will be described. The present invention is not limited to the examples described in this embodiment.

The inventors of the present invention have made extensive investigations on technical means for obtaining a carbon catalyst having excellent catalytic activity and excellent durability, and as a result, have uniquely found that a carbon catalyst, which has a crystallite size Lc obtained by powder X-ray diffraction falling within a particular range, and which exhibits a carbon monoxide desorption amount and/or a carbon dioxide desorption amount equal to or less than a particular threshold value within a particular temperature range in a temperature programmed desorption method, has excellent catalytic activity and excellent durability, to thereby complete the present invention.

That is, in one aspect, the carbon catalyst according to the one embodiment of the present invention has a carbon structure that has a crystallite size Lc falling within a range of 0.80 nm or more and 1.20 nm or less calculated through use of a Bragg angle of a diffraction peak $f_{broad}$ at a diffraction angle 2θ of 24.0°±4.0° obtained by separating a diffraction peak in the vicinity of a diffraction angle 2θ of 26° in an X-ray diffraction (hereinafter referred to as "XRD") pattern obtained by powder XRD using a CuKα ray, and that exhibits a carbon dioxide ($CO_2$) desorption amount in the temperature range from 650° C. to 1,200° C. of 97 μmol/g or less in a temperature programmed desorption method (hereinafter referred to as "TPD") including measuring a $CO_2$ desorption amount in the temperature range from 25° C. to 1,200° C.

When the carbon structure of the carbon catalyst has a laminated structure formed of a curved carbon network plane that contributes to the catalytic activity of the carbon catalyst, a carbon (002) diffraction line appears in the vicinity of a diffraction angle 2θ of 26° (e.g., within a range of 23.0° or more and 27.0° or less) in an XRD pattern using a CuKα ray. The carbon (002) diffraction line may include a (002) diffraction line derived from a graphite structure that is a high-crystalline component and one or two (002) diffraction lines each derived from a low-crystalline component.

Specifically, through peak separation, the carbon (002) diffraction peak in the vicinity of a diffraction angle (2θ) of 26° may be separated into three diffraction peaks, that is, two diffraction peaks $f_{broad}$ and $f_{middle}$ of the low-crystalline components and a diffraction peak $f_{narrow}$ of the high-crystalline component.

Specifically, the broad peak $f_{broad}$ is defined as a diffraction peak having a diffraction angle 2θ of 24.0°±4.0° and a full width at half maximum of 10.0°±7.0°. The middle peak $f_{middle}$ is defined as a diffraction peak having a diffraction angle 2θ of 26.2°±0.3° and a full width at half maximum of 2.0°±0.99°. The narrow peak $f_{narrow}$ is defined as a diffraction peak having a diffraction angle 2θ of 26.5°±0.5° and a full width at half maximum of 0.3°±0.2°.

All the three diffraction peaks are not always obtained through the peak separation. Of the three diffraction peaks, only two diffraction peaks (e.g., only two diffraction peaks $f_{broad}$ and $f_{middle}$ of the low-crystalline components) may be obtained. Of the three diffraction peaks, only one diffraction peak (e.g., only one diffraction peak $f_{broad}$ of the low-crystalline component) may be obtained.

The broad peak $f_{broad}$ obtained through the peak separation is analyzed to calculate the crystallite size Lc. Specifically, the crystallite size Lc is calculated by substituting a Bragg angle of the broad peak $f_{broad}$ obtained through the peak separation into the following Scherrer equation: $Lc = K\lambda/\beta \cos\theta$. In the Scherrer equation, K represents a Scherrer constant (0.94), λ represents a wavelength (0.15418 nm) of a CuKα ray, β represents a full width at half maximum (radian), and θ represents a Bragg angle (radian).

It is preferred that the crystallite size Lc of the carbon structure of the catalyst of the present invention fall within a range of 0.90 nm or more and 1.20 nm or less. The fact that the crystallite size Lc of the carbon structure of the catalyst of the present invention falls within the above-mentioned particular range contributes to excellent catalytic activity of the catalyst of the present invention. Specifically, when the number of active points contained in the carbon structure of the carbon catalyst is increased, the interaction between network planes of the carbon structure is weakened. Therefore, the lamination number of the network planes is decreased, with the result that the crystallite size Lc of the carbon structure becomes smaller. Thus, the fact that the crystallite size Lc of the carbon structure of the catalyst of the present invention falls within the above-mentioned particular range, in particular, is equal to or less than the above-mentioned particular upper limit value indicates that the number of active points contained in the carbon structure is large, that is, the catalytic activity of the catalyst of the present invention is high.

In addition, the carbon structure of the catalyst of the present invention exhibits a $CO_2$ desorption amount in the temperature range from 650° C. to 1,200° C. in the TPD of preferably 90 μmol/g or less, more preferably 86 μmol/g or less, still more preferably 80 μmol/g or less, particularly preferably 70 μmol/g or less. The carbon structure of the catalyst of the present invention may be specified by appropriately combining: one of the above-mentioned ranges of the crystallite size Lc; and one of the above-mentioned threshold values for the $CO_2$ desorption amount.

Specifically, for example, it is preferred that the carbon structure of the catalyst of the present invention have a crystallite size Lc falling within a range of 0.90 nm or more and 1.20 nm or less and exhibit a $CO_2$ desorption amount of 90 μmol/g or less, more preferably 86 μmol/g or less, still more preferably 80 μmol/g or less, particularly preferably 70 μmol/g or less.

The catalyst of the present invention has excellent catalytic activity and excellent durability when the carbon structure thereof has a crystallite size Lc falling within the above-mentioned particular range and exhibits a $CO_2$ desorption amount in the temperature range from 650° C. to 1,200° C. in the TPD equal to or less than the above-mentioned particular threshold value. There is no particular limitation on a lower limit value of the $CO_2$ desorption amount of the catalyst of the present invention. The carbon structure of the catalyst of the present invention may exhibit a $CO_2$ desorption amount in the temperature range from 650° C. to 1,200° C. of 5 μmol/g or more in the TPD.

In another aspect, the carbon catalyst according to the one embodiment of the present invention has a carbon structure that has a crystallite size Lc falling within a range of 0.80 nm or more and 1.20 nm or less calculated through use of a Bragg angle of a diffraction peak $f_{broad}$ at a diffraction angle 2θ of 24.0°±4.0° obtained by separating a diffraction peak in the vicinity of a diffraction angle 2θ of 26° in an XRD pattern obtained by powder XRD using a CuKα ray, and that exhibits a total of a carbon monoxide (CO) desorption amount and a carbon dioxide ($CO_2$) desorption amount (hereinafter referred to as "(CO+$CO_2$) desorption amount") in the temperature range from 650° C. to 1,200° C. of 647 μmol/g or less in TPD including measuring a CO desorption amount and a $CO_2$ desorption amount in the temperature range from 25° C. to 1,200° C.

Also in this case, it is preferred that the crystallite size Lc of the carbon structure of the catalyst of the present invention fall within a range of 0.90 nm or more and 1.20 nm or less. In addition, the carbon structure of the catalyst of the present invention exhibits a ($CO+CO_2$) desorption amount in the temperature range from 650° C. to 1,200° C. in the TPD of preferably 635 μmol/g or less, more preferably 620 μmol/g or less, still more preferably 600 μmol/g or less, and particularly preferably 580 μmol/g or less. The carbon structure of the catalyst of the present invention may be specified by appropriately combining: one of the above-mentioned ranges of the crystallite size Lc; and one of the above-mentioned threshold values for the ($CO+CO_2$) desorption amount.

Specifically, for example, it is preferred that the carbon structure of the catalyst of the present invention have a crystallite size Lc falling within a range of 0.90 nm or more and 1.20 nm or less and exhibit a ($CO+CO_2$) desorption amount of 635 μmol/g or less, more preferably 620 μmol/g or less, still more preferably 600 μmol/g or less, particularly preferably 580 μmol/g or less.

The catalyst of the present invention has excellent catalytic activity and excellent durability when the carbon structure thereof has a crystallite size Lc falling within the above-mentioned particular range and exhibits a ($CO+CO_2$) desorption amount in the temperature range from 650° C. to 1,200° C. in the TPD equal to or less than the above-mentioned particular threshold value. There is no particular limitation on a lower limit value of the ($CO+CO_2$) desorption amount of the catalyst of the present invention. The carbon structure of the catalyst of the present invention may exhibit a ($CO+CO_2$) desorption amount in the temperature range from 650° C. to 1,200° C. of 45 μmol/g or more in the TPD.

In addition, the catalyst of the present invention may have a carbon structure that has a crystallite size Lc falling within a range of 0.80 nm or more and 1.20 nm or less, and that exhibits a $CO_2$ desorption amount in the temperature range from 650° C. to 1,200° C. of 97 μmol/g or less and a ($CO+CO_2$) desorption amount in the temperature range from 650° C. to 1,200° C. of 647 μmol/g or less in the temperature programmed desorption method including measuring a CO desorption amount and a $CO_2$ desorption amount in the temperature range from 25° C. to 1,200° C. In this case, the carbon structure of the catalyst of the present invention may be specified by appropriately combining: one of the above-mentioned ranges of the crystallite size Lc; one of the above-mentioned threshold values for the $CO_2$ desorption amount; and one of the above-mentioned threshold values for the ($CO+CO_2$) desorption amount.

Specifically, for example, it is preferred that the carbon structure of the catalyst of the present invention have a crystallite size Lc falling within a range of 0.90 nm or more and 1.20 nm or less and exhibit a $CO_2$ desorption amount of 90 μmol/g or less and a total of a CO desorption amount and a $CO_2$ desorption amount of 635 μmol/g or less, more preferably a $CO_2$ desorption amount of 86 μmol/g or less and a total of a CO desorption amount and a $CO_2$ desorption amount of 620 μmol/g or less, still more preferably a $CO_2$ desorption amount of 80 μmol/g or less and a total of a CO desorption amount and a $CO_2$ desorption amount of 600 μmol/g or less, and particularly preferably a $CO_2$ desorption amount of 70 μmol/g or less and a total of a CO desorption amount and a $CO_2$ desorption amount of 580 μmol/g or less.

In still another aspect, the carbon catalyst according to the one embodiment of the present invention has a carbon structure that has a crystallite size Lc falling within a range of 0.80 nm or more and 1.20 nm or less calculated through use of a Bragg angle of a diffraction peak $f_{broad}$ at a diffraction angle 2θ of 24.0°±4.0° obtained by separating a diffraction peak in the vicinity of a diffraction angle 2θ of 26° in an XRD pattern obtained by powder XRD using a CuKα ray, and that exhibits a CO desorption amount in the temperature range from 650° C. to 1,200° C. of 549 μmol/g or less in TPD including measuring a CO desorption amount in the temperature range from 25° C. to 1,200° C.

Also in this case, it is preferred that the crystallite size Lc of the carbon structure of the catalyst of the present invention fall within a range of 0.90 nm or more and 1.20 nm or less. In addition, the carbon structure of the catalyst of the present invention exhibits a CO desorption amount in the temperature range from 650° C. to 1,200° C. in the TPD of preferably 547 μmol/g or less, particularly preferably 545 μmol/g or less. The carbon structure of the catalyst of the present invention may be specified by appropriately combining: one of the above-mentioned ranges of the crystallite size Lc; and one of the above-mentioned threshold values for the CO desorption amount.

Specifically, for example, it is preferred that the carbon structure of the catalyst of the present invention have a crystallite size Lc falling within a range of 0.90 nm or more and 1.20 nm or less and exhibit a CO desorption amount of 547 μmol/g or less, particularly preferably 545 μmol/g or less.

The catalyst of the present invention has excellent catalytic activity and excellent durability when the carbon structure thereof has a crystallite size Lc falling within the above-mentioned particular range and exhibits a CO desorption amount in the temperature range from 650° C. to 1,200° C. in the TPD equal to or less than the above-mentioned particular threshold value. There is no particular limitation on a lower limit value of the CO desorption amount of the catalyst of the present invention. The carbon structure of the catalyst of the present invention may exhibit a CO desorption amount in the temperature range from 650° C. to 1,200° C. of 40 μmol/g or more in the TPD.

In addition, the catalyst of the present invention may have a carbon structure that has a crystallite size Lc falling within a range of 0.80 nm or more and 1.20 nm or less, and that exhibits a CO desorption amount in the temperature range from 650° C. to 1,200° C. of 549 μmol/g and a $CO_2$ desorption amount in the temperature range from 650° C. to 1,200° C. of 97 μmol/g or less in the TPD including measuring a CO desorption amount and a $CO_2$ desorption amount in the temperature range from 25° C. to 1,200° C. In this case, the carbon structure of the catalyst of the present invention may be specified by appropriately combining: one of the above-mentioned ranges of the crystallite size Lc; one of the above-mentioned threshold values for the CO desorption amount; and one of the above-mentioned threshold values for the $CO_2$ desorption amount.

Specifically, for example, it is preferred that the carbon structure of the catalyst of the present invention have a crystallite size Lc falling within a range of 0.90 nm or more and 1.20 nm or less and exhibit a CO desorption amount of 547 μmol/g or less and a $CO_2$ desorption amount of 90 μmol/g or less, more preferably a CO desorption amount of 547 μmol/g or less and a $CO_2$ desorption amount of 86 μmol/g or less, still more preferably a CO desorption amount of 545 μmol/g or less and a $CO_2$ desorption amount of 80 μmol/g or less, particularly preferably a CO desorption amount of 545 μmol/g or less and a $CO_2$ desorption amount of 70 μmol/g or less.

In addition, the catalyst of the present invention may have a carbon structure that has a crystallite size Lc falling within a range of 0.80 nm or more and 1.20 nm or less, and that exhibits a CO desorption amount in the temperature range from 650° C. to 1,200° C. of 549 μmol/g or less and a ($CO+CO_2$) desorption amount in the temperature range from 650° C. to 1,200° C. of 647 μmol/g or less in the temperature programmed desorption method including measuring a CO desorption amount and a $CO_2$ desorption amount in the temperature range from 25° C. to 1,200° C. In this case, the carbon structure of the catalyst of the present invention may be specified by appropriately combining: one of the above-mentioned ranges of the crystallite size Lc; one of the above-mentioned threshold values for the CO desorption amount; and one of the above-mentioned threshold values for the ($CO+CO_2$) desorption amount.

Specifically, for example, it is preferred that the carbon structure of the catalyst of the present invention have a crystallite size Lc falling within a range of 0.90 nm or more and 1.20 nm or less and exhibit a CO desorption amount of 547 μmol/g or less and a ($CO+CO_2$) desorption amount of 635 μmol/g or less, more preferably a CO desorption amount of 547 μmol/g or less and a ($CO+CO_2$) desorption amount of 620 μmol/g or less, still more preferably a CO desorption amount of 545 μmol/g or less and a ($CO+CO_2$) desorption amount of 600 μmol/g or less, and particularly preferably a CO desorption amount of 545 μmol/g or less and a ($CO+CO_2$) desorption amount of 580 μmol/g or less.

In addition, the catalyst of the present invention may have a carbon structure that has a crystallite size Lc falling within a range of 0.80 nm or more and 1.20 nm or less, and that exhibits a CO desorption amount in the temperature range from 650° C. to 1,200° C. of 549 μmol/g or less, a $CO_2$ desorption amount in the temperature range from 650° C. to 1,200° C. of 97 μmol/g or less, and a ($CO+CO_2$) desorption amount in the temperature range from 650° C. to 1,200° C. of 647 μmol/g or less in the temperature programmed desorption method including measuring a CO desorption amount and a $CO_2$ desorption amount in the temperature range from 25° C. to 1,200° C. In this case, the carbon structure of the catalyst of the present invention may be specified by appropriately combining: one of the above-mentioned ranges of the crystallite size Lc; one of the above-mentioned threshold values for the CO desorption amount; one of the above-mentioned threshold values for the $CO_2$ desorption amount; and one of the above-mentioned threshold values for the ($CO+CO_2$) desorption amount.

Specifically, for example, it is preferred that the carbon structure of the catalyst of the present invention have a crystallite size Lc falling within a range of 0.90 nm or more and 1.20 nm or less and exhibit a CO desorption amount of 547 μmol/g or less, a $CO_2$ desorption amount of 90 μmol/g or less, and a ($CO+CO_2$) desorption amount of 635 μmol/g or less, more preferably a CO desorption amount of 547 μmol/g or less, a $CO_2$ desorption amount of 86 μmol/g or less, and a ($CO+CO_2$) desorption amount of 620 μmol/g or less, still more preferably a CO desorption amount of 545 μmol/g or less, a $CO_2$ desorption amount of 80 μmol/g or less, and a ($CO+CO_2$) desorption amount of 600 μmol/g or less, and particularly preferably a CO desorption amount of 545 μmol/g or less, a $CO_2$ desorption amount of 70 μmol/g or less, and a ($CO+CO_2$) desorption amount of 580 μmol/g or less.

In the TPD, the carbon catalyst is heated, and the desorption amount of carbon monoxide (CO) and/or the desorption amount of carbon dioxide ($CO_2$) from the carbon catalyst is measured within a temperature range of from 25° C. to 1,200° C., without performing pretreatment including heat treatment for desorbing a functional group and subsequent oxygen adsorption.

The CO desorption amount and/or the $CO_2$ desorption amount in the TPD specified as one of the characteristics of the catalyst of the present invention reflects the quality and amount of an oxygen-containing functional group contained in the carbon structure of the catalyst of the present invention. Specifically, the catalyst of the present invention has such a carbon structure having a small content of an oxygen-containing functional group as to exhibit a CO desorption amount and/or a $CO_2$ desorption amount equal to or less than the above-mentioned particular threshold value within the above-mentioned particular temperature range in the TPD. The fact that the content of the oxygen-containing functional group in the carbon structure of the catalyst of the present invention is small contributes to excellent durability of the catalyst of the present invention.

Specifically, it is considered that the electrochemical oxidation degradation of the carbon structure proceeds by a sequential oxidation reaction with the oxygen-containing functional group being a starting point. Thus, it is considered that, when the content of the oxygen-containing functional group in the carbon structure, which may serve as the starting point of oxidation degradation, is reduced, the number of degradation starting points in the carbon structure is reduced, leading to contribution to improvement of the durability of the carbon structure. In this respect, the inventors of the present invention have found that, among oxygen-containing functional groups, in particular, a particular oxygen-containing functional group, which causes desorption of CO and/or desorption of $CO_2$ within a particular temperature range of from 650° C. to 1,200° C. in the TPD, significantly affects the durability of the carbon catalyst.

The catalyst of the present invention may have a carbon structure that exhibits a ratio of a minimum intensity between a G band in the vicinity of 1,580 cm$^{-1}$ and a D band in the vicinity of 1,360 cm$^{-1}$ to an intensity of the G band (hereinafter referred to as "$I_v/I_g$ ratio") of 0.30 or more and 0.49 or less in a Raman spectrum obtained by Raman spectroscopy.

In this case, in the Raman spectrum obtained by Raman spectroscopy of the catalyst of the present invention, the G band is detected in the vicinity of 1,580 cm$^{-1}$ (e.g., 1,550 cm$^{-1}$ or more and 1,650 cm$^{-1}$ or less), and the D band is detected in the vicinity of 1,360 cm$^{-1}$ (e.g., 1,250 cm$^{-1}$ or more and 1,400 cm or less). The $I_v/I_g$ ratio calculated as a ratio of the minimum intensity $I_v$ between the G band and the D band to the intensity $I_g$ of the G band is 0.30 or more and 0.49 or less.

In this case, in the Raman spectrum, the G band is a component derived from an ideal graphite structure, and the D band is a component derived from a curved structure containing a defect and an edge. The minimum intensity $I_v$ between the G band and the D band depends on a component derived from an amorphous structure. Thus, the $I_v/I_g$ ratio is a ratio of the amount of the amorphous structure to the amount of the ideal graphite structure. In the carbon structure, active points are present in the amorphous structure. When the amount of the amorphous structure is excessively large, the carbon catalyst is liable to be degraded. Therefore, it is considered that there is an optimum range of the $I_v/I_g$ ratio. In this respect, the fact that the $I_v/I_g$ ratio of the carbon structure of the catalyst of the present invention falls within the above-mentioned particular range contributes to excellent catalytic activity of the catalyst of the present invention.

The catalyst of the present invention may have a carbon structure that exhibits a half width of the D band in the vicinity of 1,360 cm of 179 cm or less in the Raman spectrum obtained by Raman spectroscopy. In this case, in the Raman spectrum obtained by Raman spectroscopy of the catalyst of the present invention, the D band having a half width of 179 $cm^{-1}$ or less is detected in the vicinity of 1,360 $cm^{-1}$ (e.g., 1,250 $cm^{-1}$ or more and 1,400 $cm^{-1}$ or less).

The half width of the D band is calculated by the following expression: Half width ($cm^{-1}$) of D band=$(A_d - B_d) \times 2$ (in this expression, $A_d$ represents a wave number ($cm^{-1}$) corresponding to the intensity $I_d$ of the D band (peak top of the D band), and $B_d$ represents a wave number ($cm^{-1}$) corresponding to a Raman spectrum that exhibits an intensity of a half of the D band intensity $I_d$ on a wave number side lower than $A_d$).

In this case, in the Raman spectrum, the half width of the D band shows crystallinity of the curved structure contained in the carbon structure. Specifically, a small half width of the D band means that the crystallinity of the curved structure is high. Therefore, the fact that the D band half width of the carbon structure of the catalyst of the present invention is equal to or less than the above-mentioned particular threshold value means that the carbon structure contains a curved structure having high crystallinity. Then, the fact that the catalyst of the present invention has a carbon structure containing a curved structure having high crystallinity contributes to excellent durability of the catalyst of the present invention. While there is no particular limitation on a lower limit value of the D band half width of the catalyst of the present invention, the D band half width may be 80 $cm^{-1}$ or more.

The catalyst of the present invention may have a carbon structure that exhibits a half width of the G band in the vicinity of 1,580 $cm^{-1}$ of 80 $cm^{-1}$ or less in the Raman spectrum obtained by Raman spectroscopy. In this case, in the Raman spectrum obtained by Raman spectroscopy of the catalyst of the present invention, the G band having a half width of 80 cm or less is detected in the vicinity of 1,580 $cm^{-1}$ (e.g., 1,550 $cm^{-1}$ or more and 1,650 $cm^{-1}$ or less).

The half width of the G band is calculated by the following expression: Half width ($cm^{-1}$) of G band={Absolute value of $(A_g - B_g)$}$\times 2$ (in this expression, $A_g$ represents a wave number ($cm^{-1}$) corresponding to the intensity $I_g$ of the G band (peak top of the G band), and $B_g$ represents a wave number ($cm^{-1}$) corresponding to a Raman spectrum that exhibits an intensity of a half of the G band intensity $I_g$ on a wave number side higher than $A_g$.

In this case, in the Raman spectrum, the half width of the G band shows crystallinity of the graphite structure contained in the carbon structure. Specifically, a small half width of the G band means that the crystallinity of the graphite structure is high. Therefore, the fact that the G band half width of the carbon structure of the catalyst of the present invention is equal to or less than the above-mentioned particular threshold value means that the carbon structure contains a graphite structure having high crystallinity. Then, the fact that the catalyst of the present invention has a carbon structure containing a graphite structure having high crystallinity contributes to excellent durability of the catalyst of the present invention. While there is no particular limitation on a lower limit value of the G band half width of the catalyst of the present invention, the G band half width may be 40 $cm^{-1}$ or more.

The catalyst of the present invention may contain a metal. In this case, there is no particular limitation on the metal contained in the catalyst of the present invention as long as the above-mentioned characteristics of the catalyst of the present invention are obtained, but the metal is preferably a transition metal. In addition, the catalyst of the present invention contains preferably two or more kinds of metals, more preferably two or more kinds of transition metals.

In this embodiment, the transition metal is a metal belonging to Groups III to XII in the periodic table, preferably a transition metal belonging to the fourth period of Groups III to XII in the periodic table. Specifically, the transition metal contained in the catalyst of the present invention may be, for example, one or more kinds selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), silver (Ag), lanthanoids (e.g., one or more kinds selected from the group consisting of neodymium (Nd), samarium (Sm), and gadolinium (Gd)), and actinoids, or the group consisting of Sc, Ti, V, Cr, Mn, Fe, Co, Ni, Cu, Zn, Y, Zr, Nb, Mo, Ag, lanthanoids (e.g., one or more kinds selected from the group consisting of Nd, Sm, and Gd), and actinoids, or may be two or more kinds selected from the group.

In addition, the catalyst of the present invention contains preferably one or more kinds selected from the group consisting of Ti, Cr, Fe, Zn, Nd, Sm, and Gd, and more preferably two or more kinds selected from the group. In this case, the catalyst of the present invention may contain one or more kinds selected from the group consisting of Fe and Zn or may contain Fe and Zn.

When the catalyst of the present invention contains the above-mentioned particular transition metal, the catalyst of the present invention may further contain another transition metal. That is, for example, when the catalyst of the present invention contains one or more kinds or two or more kinds of first transition metals selected from the group consisting of Ti, Cr, Fe, Zn, Nd, Sm, and Gd, the catalyst of the present invention may further contain one or more kinds of second transition metals selected from the group consisting of Sc, Ti, V, Cr, Mn, Fe, Co, Ni, Cu, Zn, Y, Zr, Nb, Mo, Ru, Rh, Pd, Ag, lanthanoids (e.g., one or more kinds selected from the group consisting of Nd, Sm, and Gd), and actinoids, or the group consisting of Sc, Ti, V, Cr, Mn, Fe, Co, Ni, Cu, Zn, Y, Zr, Nb, Mo, Ag, lanthanoids (e.g., one or more kinds selected from the group consisting of Nd, Sm, and Gd), and actinoids, which are different from the first transition metals.

In addition, the catalyst of the present invention may be free of platinum (Pt). The catalyst of the present invention may be free of one or more kinds selected from the group consisting of platinum (Pt), ruthenium (Ru), rhodium (Rh), palladium (Pd), iridium (Ir), gold (Au), and osmium (Os).

When the catalyst of the present invention contains a metal derived from a raw material for carbonization described later, the catalyst of the present invention contains the metal therein, which has been contained in the raw material for carbonization. Specifically, even when the catalyst of the present invention is produced through metal removal treatment described later, a trace amount of the metal derived from the raw material remains in the catalyst of the present invention.

Specifically, for example, in the case where the catalyst of the present invention containing a metal is particulate, when a particle forming the catalyst of the present invention is cut, the metal is detected on a cross section of the particle exposed by cutting. The metal contained in the catalyst of the present invention may be detected, for example, by an inductively-coupled plasma (ICP) emission spectrophotometric method.

The catalyst of the present invention may have a specific surface area of 800 m$^2$/g or more measured by a BET method. In this case, the specific surface area of the catalyst of the present invention is preferably 1,000 m$^2$/g or more, particularly preferably 1,200 m$^2$/g or more.

The fact that the specific surface area of the catalyst of the present invention is equal to or more than the above-mentioned particular threshold value contributes to streamlining of a chemical reaction by the catalyst of the present invention, and to excellent catalytic activity. While there is no particular limitation on an upper limit value of the specific surface area of the catalyst of the present invention, the specific surface area may be 3,000 m$^2$/g or less.

The catalyst of the present invention may have a carbon structure that exhibits a ratio of a nitrogen atom concentration (atm %) to a carbon atom concentration (atm %) (hereinafter referred to as "N/C ratio") of 1.5% or more, the nitrogen atom concentration and the carbon atom concentration being measured by X-ray photoelectron spectroscopy (hereinafter referred to as "XPS"). In this case, the carbon structure of the catalyst of the present invention exhibits a N/C ratio of preferably 1.8% or more, particularly preferably 2.0% or more.

The fact that the N/C ratio of the carbon structure of the catalyst of the present invention is equal to or more than the above-mentioned particular threshold value means that the carbon structure contains a large amount of a nitrogen-containing functional group on the surface, which contributes to excellent catalytic activity of the catalyst of the present invention. While there is no particular limitation on an upper limit value of the N/C ratio of the catalyst of the present invention, the N/C ratio may be 15.0% or less.

The catalyst of the present invention may have a carbon structure that exhibits a nitrogen atom content of 1.5 wt % or more measured by elemental analysis based on a combustion method. In this case, the carbon structure of the catalyst of the present invention exhibits a nitrogen atom content of preferably 1.8 wt % or more, particularly preferably 2.0 wt % or more.

The fact that the nitrogen atom content of the carbon structure of the catalyst of the present invention is equal to or more than the above-mentioned particular threshold value means that the carbon structure contains a large amount of a nitrogen-containing functional group, which contributes to excellent catalytic activity of the catalyst of the present invention. While there is no particular limitation on an upper limit value of the nitrogen atom content of the catalyst of the present invention, the nitrogen atom content may be 15 wt % or less.

The catalyst of the present invention may have an average particle diameter of 1.0 μm or less. The fact that the average particle diameter of the catalyst of the present invention is equal to or less then the above-mentioned particular threshold value contributes to streamlining of a chemical reaction by the catalyst of the present invention, and to excellent catalytic activity of the catalyst of the present invention, and also contributes to streamlining in manufacturing of a battery electrode including the catalyst of the present invention. While there is no particular limitation on a lower limit value of the average particle diameter of the catalyst of the present invention, the average particle diameter may be 0.050 μm or more.

The catalyst of the present invention may have a maximum particle diameter of 1,000.0 μm or less. In this case, the maximum particle diameter of the catalyst of the present invention is, for example, preferably 50.0 μm or less, particularly preferably 10.0 μm or less. Specifically, for example, when the catalyst of the present invention is a carbon catalyst for a fuel cell (e.g., a carbon catalyst for a cathode or an anode of the fuel cell, preferably a carbon catalyst for a cathode of the fuel cell), the maximum particle diameter of the catalyst of the present invention is preferably 50.0 μm or less, particularly preferably 10.0 μm or less. In addition, in those cases, while there is no particular limitation on a minimum particle diameter of the catalyst of the present invention, the minimum particle diameter may be 0.001 μm or more.

The catalyst of the present invention may exhibit a voltage (hereinafter referred to as "oxygen reduction-starting potential ($E_{O2}$)") of 0.810 V (vs. NHE) or more at a time when a reduction current of −10 μA/cm$^2$ flows in an oxygen reduction voltammogram obtained by performing sweep application of a potential through use of a rotating ring disk electrode device including a working electrode containing the catalyst of the present invention.

The fact that the oxygen reduction-starting potential $E_{O2}$ of the catalyst of the present invention is equal to or more than the above-mentioned particular threshold value supports excellent catalytic activity of the catalyst of the present invention. While there is no particular limitation on an upper limit value of the oxygen reduction-starting potential $E_{O2}$ of the catalyst of the present invention, the potential $E_{O2}$ may to 1.0 V (vs. NHE) or less.

The catalyst of the present invention may exhibit a current density ($i_{0.7}$) of −1.0 mA/cm$^2$ or less at a time when a voltage of 0.7V (vs. NHE) is applied in an oxygen reduction voltammogram obtained by performing sweep application of a potential through use of a rotating ring disk electrode device including a working electrode containing the catalyst of the present invention.

The fact that the current density $i_{0.7}$ (mA/cm$^2$) of the catalyst of the present invention is equal to or less than the above-mentioned particular threshold value supports excellent catalytic activity of the catalyst of the present invention. While there is no particular limitation on a lower limit value of the current density $i_{0.7}$ (mA/cm$^2$) of the catalyst of the present invention, the current density $i_{0.7}$ may be −5.0 mA/cm$^2$ or more.

Regarding an area of a region enclosed by a curve at a time of sweep application of a potential of from 1.0 V to 0.0 V and a curve at a time of sweep application of a potential of from 0.0 V to 1.0 V (hereinafter referred to as "CV area") in a voltammogram at a fifth cycle, the voltammogram being obtained by performing sweep application of a potential for five cycles within a range of from 0.0 V to 1.0 V (vs. NHE) through use of a rotating ring disk electrode device including a working electrode containing the catalyst of the present invention at each of a time of starting and a time of ending of a durability test in which a state of applying a voltage of 1.2 V (vs. RHE) is kept for 10 minutes through use of the rotating ring disk electrode device, the catalyst of the present invention may exhibit an area increase amount (hereinafter referred to as "CV area increase amount") of 5.70×10$^{-5}$ A·sec or less, the area increase amount being obtained by subtracting the CV area at the time of ending of the durability test from the area at the time of starting of the durability test.

In this case, the catalyst of the present invention exhibits a CV area increase amount of preferably 5.50×10$^{-5}$ A·sec or less, more preferably 5.30×10$^{-5}$ A·sec or less, particularly preferably 5.10×10$^{-5}$ A·sec or less.

In this case, the CV area shows a capacity of an electric double layer in the working electrode containing the carbon catalyst and reflects the state of fine pores contained in the carbon catalyst and the information on a surface functional group thereof. The fact that the CV area increase amount is large indicates that the degradation of the carbon catalyst proceeds, the fine pores contained in the carbon catalyst and the surface functional group thereof are changed, and the capacity of the electric double layer in the working electrode containing the carbon catalyst is increased. Thus, the fact that the CV area increase amount of the catalyst of the present invention is equal to or less than the above-mentioned particular threshold value supports excellent durability of the catalyst of the present invention. While there is no particular limitation on a lower limit value of the CV area increase amount of the catalyst of the present invention, the CV area increase amount may be $4.50 \times 10^{-5}$ A·sec or more.

Regarding a current density $i_{0.7}$ (mA/cm$^2$) at a time when a voltage of 0.7 V (vs. NHE) is applied in an oxygen reduction voltammogram obtained by performing sweep application of a potential through use of a rotating ring disk electrode device including a working electrode containing the catalyst of the present invention at each of a time of starting and a time of ending of a durability test in which a state of applying a voltage of 1.2 V (vs. RHE) is kept for 10 minutes through use of the rotating ring disk electrode device, the catalyst of the present invention may exhibit a current density $i_{0.7}$ maintenance ratio of 88.0% or more, the current density $i_{0.7}$ maintenance ratio being obtained by multiplying a value, which is obtained by dividing the current density at the time of ending of the durability test by the current density at the time of starting of the durability test, by 100.

In this case, the catalyst of the present invention exhibits a current density $i_{0.7}$ maintenance ratio of preferably 89.0% or more, more preferably 90.0% or more, particularly preferably 91.0% or more.

The fact that the current density $i_{0.7}$ maintenance ratio of the catalyst of the present invention is equal to or more than the above-mentioned particular threshold value supports excellent durability of the catalyst of the present invention. While there is no particular limitation on an upper limit value of the current density $i_{0.7}$ maintenance ratio of the catalyst of the present invention, the current density $i_{0.7}$ maintenance ratio may be 95% or less.

The catalyst of the present invention is formed of a carbon material having catalytic activity by itself. The carbon material forming the catalyst of the present invention is, for example, a carbonized material obtained by carbonizing a raw material containing an organic substance as described later. In addition, when the catalyst of the present invention is formed of a carbonized material obtained by carbonizing a raw material containing an organic substance and a metal, the metal is contained in the carbon structure of the catalyst of the present invention. In this case, it is considered that the catalytic activity of the catalyst of the present invention is mainly ascribed to an active point contained in the carbon structure itself rather than the metal. The foregoing is supported by the fact that, even when the catalyst of the present invention containing a metal derived from a raw material for carbonization is subjected to metal removal treatment for reducing the content of the metal, the catalytic activity of the catalyst of the present invention after the metal removal treatment is not substantially decreased compared to that before the metal removal treatment, and the fact that a carbon material in which a metal is carried on a surface of a carbonized material after carbonization, the carbonized material being obtained by carbonizing a raw material containing an organic substance but not containing a metal, does not have excellent catalytic activity, unlike the catalyst of the present invention. The catalytic activity of the catalyst of the present invention is, for example, oxidation activity and/or reduction activity, and more specifically, oxygen reduction activity and/or hydrogen oxidation activity.

The catalyst of the present invention may be free of Pt, or the catalyst of the present invention may be free of a rare metal such as Pt, because the catalyst of the present invention has catalytic activity by itself. However, the present invention is not limited thereto, and the catalyst of the present invention may be used as a carrier for carrying the rare metal. In this case, the rare metal carried by the catalyst of the present invention is, for example, one or more kinds selected from the group consisting of Pt, Ru, Rh, Pd, Ir, Au, and Os.

Even when the catalyst of the present invention is used as a carrier for a rare metal, the catalyst of the present invention serving as a carrier that has not carried the rare metal (catalyst of the present invention before carrying the rare metal) is a carbon material having catalytic activity by itself, that is, a carbon catalyst.

There is no particular limitation on a production method for the catalyst of the present invention as long as the catalyst of the present invention having the above-mentioned characteristics is obtained. In this embodiment, a method including carbonizing a raw material containing an organic substance under pressure is described.

The organic substance contained in the raw material is not particularly limited as long as the organic substance can be carbonized. Specifically, as the organic substance, for example, high-molecular-weight organic compounds (e.g., resins such as a thermosetting resin and/or a thermoplastic resin), and/or low-molecular-weight organic compounds are used. In addition, a biomass may be used as the organic substance.

As the organic substance, a nitrogen-containing organic substance is preferably used. The nitrogen-containing organic substance is not particularly limited as long as the nitrogen-containing organic substance is an organic substance containing an organic compound that contains a nitrogen atom in a molecule thereof. When the catalyst of the present invention is a carbonized material obtained by carbonizing a raw material containing the nitrogen-containing organic substance, the carbon structure of the catalyst of the present invention contains a nitrogen atom.

Specifically, for example, one or more kinds selected from the group consisting of polyacrylonitrile, a polyacrylonitrile-polyacrylic acid copolymer, a polyacrylonitrile-polymethyl acrylate copolymer, a polyacrylonitrile-polymethacrylic acid copolymer, a polyacrylonitrile-polymethacrylic acid-polymethallylsulfonic acid copolymer, a polyacrylonitrile-polymethyl methacrylate copolymer, a phenol resin, polyfurfuryl alcohol, furan, a furan resin, a phenol formaldehyde resin, melamine, a melamine resin, an epoxy resin, a nitrogen-containing chelate resin (e.g., one or more kinds selected from the group consisting of polyamine-type, iminodiacetic acid-type, aminophosphoric acid-type, and aminomethylphosphonic acid-type resins), a polyamideimide resin, pyrrole, polypyrrole, polyvinylpyrrole, 3-methylpolypyrrole, acrylonitrile, polyvinylidene chloride, thiophene, oxazole, thiazole, pyrazole, vinylpyridine, polyvinylpyridine, pyridazine, pyrimidine, piperazine, pyran, morpholine, imidazole, 1-methylimidazole, 2-methylimidazole, quinoxaline, aniline, polyaniline, succinic acid dihydrazide, adipic acid dihydrazide, polysulfone, polyaminobismaleimide, polyimide, polyvinyl alcohol, polyvinyl butyral, benzimidazole, polybenzimidazole, polyamide, polyester, polylactic acid, polyether, polyether ether ketone, cellulose, carboxymethyl cellulose, lignin, chitin, chitosan, pitch, lignite, silk, wool, polyamino acid, a nucleic acid, DNA, RNA, hydrazine, hydrazide, urea, salen, polycarbazole, polybismaleimide, triazine, polyacrylic acid, polyacrylic acid ester, polymethacrylic acid ester, polymethacrylic acid, polyurethane, polyamide amine, and polycarbodiimide are used as the organic substance.

The content of the organic substance in the raw material is not particularly limited as long as the catalyst of the present invention is obtained, and may be, for example, 5 mass % or more and 90 mass: or less, preferably 10 mass % or more and 80 mass % or less.

The raw material for carbonization may further contain metal. Specifically, in this case, the raw material containing an organic substance and a metal is carbonized under pressure. When the catalyst of the present invention is formed of a carbonized material obtained by carbonizing the raw material containing an organic substance and a metal, the catalyst of the present invention contains the metal.

The metal contained in the raw material (that is, the metal contained in the catalyst of the present invention) is preferably a transition metal. In addition, the raw material contains preferably two or more kinds of metals, more preferably two or more kinds of transition metals.

In this embodiment, the transition metal is a metal belonging to Groups III to XII in the periodic table, preferably a transition metal belonging to the fourth period of Groups III to XII in the periodic table. Specifically, the transition metal contained in the raw material may be, for example, one or more kinds selected from the group consisting of Sc, Ti, V, Cr, Mn, Fe, Co, Ni, Cu, Zn, Y, Zr, Nb, Mo, Ru, Rh, Pd, Ag, lanthanoids (e.g., one or more kinds selected from the group consisting of Nd, Sm, and Gd), and actinoids, or the group consisting of Sc, Ti, V, Cr, Mn, Fe, Co, Ni, Cu, Zn, Y, Zr, Nb, Mo, Ag, lanthanoids (e.g., one or more kinds selected from the group consisting of Nd, Sm, and Gd), and actinoids, or may be two or more kinds selected from the group.

In addition, the raw material contains preferably one or more kinds selected from the group consisting of Ti, Cr, Fe, Zn, Nd, Sm, and Gd, more preferably two or more kinds selected from the group. In this case, the raw material may contain one or more kinds selected from the group consisting of Fe and Zn or may contain Fe and Zn.

When the raw material contains the above-mentioned particular transition metal, the raw material may further contain another transition metal. That is, for example, when the raw material contains one or more kinds or two or more kinds of first transition metals selected from the group consisting of Ti, Cr, Fe, Zn, Nd, Sm, and Gd, the raw material may further contain one or more kinds of second transition metals selected from the group consisting of Sc, Ti, V, Cr, Mn, Fe, Co, Ni, Cu, Zn, Y, Zr, Nb, Mo, Ru, Rh, Pd, Ag, lanthanoids (e.g., one or more kinds selected from the group consisting of Nd, Sm, and Gd), and actinoids, or the group consisting of Sc, Ti, V, Cr, Mn, Fe, Co, Ni, Cu, Zn, Y, Zr, Nb, Mo, Ag, lanthanoids (e.g., one or more kinds selected from the group consisting of Nd, Sm, and Gd), and actinoids, which are different from the first transition metals.

In addition, the raw material may be free of Pt. The raw material may be free of one or more selected from the group consisting of Pt, Ru, Rh, Pd, Ir, Au, and Os.

As the metal contained in the raw material, a simple substance of the metal and/or a compound of the metal is used. As the metal compound, one or more kinds selected from the group consisting of, for example, a metal salt, a metal oxide, a metal hydroxide, a metal nitride, a metal sulfide, a metal carbide, and a metal complex may be used.

While there is no particular limitation on a metal content in the raw material (total content of two or more kinds of metals when the two or more kinds of metals are used) as long as the content falls within a range in which the catalyst of the present invention is obtained, the content may be, for example, 1 mass % or more and 90 mass % or less, preferably 2 mass % or more and 80 mass % or less.

Carbonization is performed by heating the raw material and keeping the raw material at a temperature at which the raw material is carbonized (hereinafter referred to as "carbonizing temperature") under pressure. The carbonizing temperature is not particularly limited as long as the raw material is carbonized. The carbonizing temperature is, for example, 300° C. or more. Specifically, in this case, the raw material containing an organic substance is carbonized at a temperature of 300° C. or more under pressure.

In addition, the carbonizing temperature may be set to, for example, 700° C. or more, preferably 900° C. or more, more preferably 1,000° C. or more, particularly preferably 1,100° C. or more. There is no particular limitation on an upper limit value of the carbonizing temperature. The carbonizing temperature is, for example, 3,000° C. or less.

A temperature increase rate up to the carbonizing temperature is, for example, 0.5° C./min or more and 300° C./min or less. The period of time for keeping the raw material at the carbonizing temperature is, for example, 1 second or more and 24 hours or less, preferably 5 minutes or more and 24 hours or less. It is preferred that the carbonization be performed in an inert gas atmosphere, such as a nitrogen atmosphere. Specifically, for example, it is preferred that the carbonization be performed under the flow of inert gas, such as nitrogen gas.

There is no particular limitation on the pressure of the atmosphere in which the carbonization is performed as long as the pressure is higher than an atmospheric pressure. The pressure is, for example, a pressure of 0.05 MPa or more in terms of a gauge pressure. Further, the pressure of the atmosphere in which the carbonization is performed in terms of a gauge pressure may be set to 0.15 MPa or more, preferably 0.20 MPa or more, more preferably 0.40 MPa or more, particularly preferably 0.50 MPa or more. Specifically, in those cases, the raw material containing an organic substance is carbonized under a pressure equal to or more than the above-mentioned threshold value (MPa) in terms of a gauge pressure.

The production method for the catalyst of the present invention may further include subjecting a carbonized material obtained by the above-mentioned carbonization to further treatment. Specifically, for example, the carbonized material may be subjected to one or more kinds of treatments selected from the group consisting of ammonia treatment, hydrogen treatment, and O-alkylation treatment. In this case, a raw material containing an organic substance is carbonized under pressure, and then the carbonized material obtained by the carbonization is subjected to one or more kinds of treatments selected from the group consisting of ammonia treatment, hydrogen treatment, and O-alkylation treatment.

There is no particular limitation on the ammonia treatment as long as the ammonia treatment includes bringing the carbonized material into contact with ammonia. Specifically, the ammonia treatment is, for example, treatment including heating the carbonized material in an ammonia-containing gas atmosphere.

While there is no particular limitation on the ammonia content of the ammonia-containing gas as long as the ammonia content falls within a range in which the effect of the ammonia treatment is obtained, the ammonia content may be, for example, 0.1 vol % or more, 1.0 vol % or more, or 3.0 vol % or more.

While there is no particular limitation on the temperature for heating the carbonized material during the ammonia treatment as long as the temperature falls within a range in which the effect of the ammonia treatment is obtained, the temperature may be, for example, 300° C. or more, preferably 500° C. or more, particularly preferably 700° C. or more. While there is no particular limitation on an upper limit value of the heating temperature, the heating temperature may be, for example, 1,300° C. or less, preferably 1,000° C. or less. The range of the heating temperature during the ammonia treatment is specified by appropriately combining: one of the above-mentioned lower limit values; and one of the above-mentioned upper limit values.

There is no particular limitation on the hydrogen treatment as long as the hydrogen treatment includes bringing the carbonized material into contact with hydrogen. Specifically, the hydrogen treatment is, for example, treatment including heating the carbonized material in a hydrogen-containing gas atmosphere. While there is no particular limitation on the hydrogen content of the hydrogen-containing gas as long as the hydrogen content falls within a range in which the effect of the hydrogen treatment is obtained, the hydrogen content may be, for example, 0.1 vol % or more, 1.0 vol % or more, or 3.0 vol % or more.

While there is no particular limitation on the temperature for heating the carbonized material during the hydrogen treatment as long as the temperature falls within a range in which the effect of the hydrogen treatment is obtained, the temperature may be, for example, 300° C. or more, preferably 500° C. or more, particularly preferably 700° C. or more. While there is no particular limitation on an upper limit value of the heating temperature, the heating temperature may be, for example, 1,300° C. or more, preferably 1,000° C. or more. The range of the heating temperature during the hydrogen treatment is specified by appropriately combining: one of the above-mentioned lower limit values; and one of the above-mentioned upper limit values.

There is no particular limitation on the O-alkylation treatment as long as the O-alkylation treatment is treatment including causing O-alkylation in the carbon structure of the carbonized material. The O-alkylation treatment is, for example, O-methylation treatment or O-ethylation treatment. The O-methylation treatment is, for example, treatment including bringing the carbonized material into contact with trimethylsilyldiazomethane under light shielding conditions in an atmosphere of inert gas, such as nitrogen gas.

In addition, the carbonized material may be subjected to metal removal treatment. In this case, for example, the raw material containing an organic substance is carbonized under pressure, and then the carbonized material obtained by the carbonization is subjected to the metal removal treatment. In addition, for example, the raw material containing an organic substance is carbonized under pressure, and then the carbonized material obtained by the carbonization is subjected to metal removal treatment, and after that, the carbonized material after the metal removal treatment is subjected to one or more kinds of treatments selected from the group consisting of ammonia treatment, hydrogen treatment, and O-alkylation treatment. The metal removal treatment is treatment including reducing the amount of a metal derived from the raw material contained in the carbonized material. The metal removal treatment is, for example, washing treatment using an acid and/or electrolytic treatment.

An electrode of the present invention includes the above-mentioned catalyst of the present invention. Specifically, the electrode of the present invention is, for example, a battery electrode carrying the catalyst of the present invention. Specifically, the electrode of the present invention is, for example, a battery electrode including an electrode base material and the catalyst of the present invention carried on the electrode base material.

Here, as described above, the catalyst of the present invention has catalytic activity by itself, and hence the electrode of the present invention may be free of Pt or the above-mentioned rare metal, such as Pt. However, the present invention is not limited thereto. The electrode of the present invention may include, for example, the catalyst of the present invention serving as a carrier for carrying the rare metal and the rare metal carried by the catalyst of the present invention.

The electrode of the present invention is, for example, an electrode of a fuel cell (e.g., a polymer electrolyte fuel cell), an air cell, a water electrolytic cell (e.g., a polymer electrolyte water electrolytic cell), a redox flow cell, or a halogen cell. In addition, the electrode of the present invention is, for example, a cathode or an anode, preferably a cathode. Specifically, the electrode of the present invention is a cathode or an anode of a fuel cell, an air cell, a water electrolytic cell, a redox flow cell, or a halogen cell, preferably a fuel cell cathode, an air cell cathode, a water electrolytic cell cathode, a redox flow cell cathode, or a halogen cell cathode.

A battery of the present invention includes the above-mentioned battery electrode. Specifically, the battery of the present invention is, for example, a fuel cell (e.g., a polymer electrolyte fuel cell), an air cell, a redox flow cell, or a halogen cell including the electrode of the present invention. The battery of the present invention may include a membrane/electrode assembly including the electrode of the present invention. The battery of the present invention is a battery including the electrode of the present invention as a cathode or an anode, preferably a battery including the electrode of the present invention as a cathode. Specifically, the battery of the present invention is a fuel cell, an air cell, a redox flow cell, or a halogen cell including the electrode of the present invention as a cathode or an anode, preferably a fuel cell, an air cell, a redox flow cell, or a halogen cell including the electrode of the present invention as a cathode.

Next, specific Examples according to this embodiment will be described.

EXAMPLES

Example 1

1.0 g of polyacrylonitrile (PAN), 1.0 g of 2-methylimidazole, 6.0 g of zinc chloride ($ZnCl_2$), and 30 g of dimethylformamide were mixed. The solvent was removed from the obtained mixture by drying. The dried mixture was heated in the atmosphere to be infusibilized at 250° C.

25 g of the infusibilized mixture, 0.03 g of iron(III) chloride hexahydrate ($FeCl_3 \cdot 6H_2O$), and 105 g of dimethylformamide were mixed. The solvent was removed from the obtained mixture by drying.

The dried mixture was heated and kept at 1,100° C. under a gauge pressure of 0.9 MPa in a nitrogen atmosphere to be carbonized.

Dilute hydrochloric acid was added to the carbonized material obtained by the carbonization, followed by stirring. After that, the suspension containing the carbonized material was filtered through use of a membrane filter, and the carbonized material was washed with distilled water until the filtrate became neutral. Thus, metal removal treatment through washing using an acid was performed.

The carbonized material after the metal removal treatment was pulverized with a pulverizer until the average particle diameter thereof became 1 μm or less. Thus, the pulverized carbonized material was obtained as a carbon catalyst of Example 1.

Example 2

The carbon catalyst obtained in Example 1 was heated and kept at 900° C. for 1 hour in an atmosphere in which 100% ammonia gas was circulated at 0.3 L/min. After that, the ammonia gas was substituted with nitrogen, and the carbon catalyst was kept at 500° C. for 10 minutes in a nitrogen atmosphere. The carbon catalyst cooled by natural cooling in the nitrogen atmosphere was obtained as a carbon catalyst of Example 2.

Example 3

Ammonium hydrogen carbonate was heated at 150° C. under the circulation of nitrogen gas, to thereby generate a mixed gas containing ammonia, carbon dioxide, and water vapor.

The carbon catalyst obtained in Example 1 was heated and kept at 900° C. for 1 hour in a nitrogen atmosphere in which the mixed gas generated as described above was circulated. After that, the mixed gas was substituted with nitrogen, and the carbon catalyst cooled by natural cooling in the nitrogen atmosphere was obtained as a carbon catalyst of Example 3.

Example 4

The carbon catalyst obtained in Example 1 was heated and kept at 900° C. for 1 hour in a 100% hydrogen atmosphere. After that, the carbon catalyst cooled by natural cooling in the hydrogen atmosphere was obtained as a carbon catalyst of Example 4.

Example 5

1.0 g of the carbon catalyst obtained in Example 1 and 100 mL of commercially available super dehydrated methanol were mixed, and the obtained mixed liquid was treated with an ultrasonic wave for 2 minutes under stirring. The mixed liquid after the ultrasonic treatment was mixed with a 1.0 M trimethylsilyldiazomethane/hexane solution under light shielding conditions in a nitrogen atmosphere and stirred for 15 hours. After that, the solvent was removed from the mixed liquid by drying. Thus, the carbon catalyst after drying was obtained as a carbon catalyst of Example 5.

Example 6

A carbon catalyst of Example 6 was obtained in the same manner as in Example 2 except that a mixture further containing 0.018 g of chromium chloride hexahydrate ($CrCl_3 \cdot 6H_2O$) was prepared before the infusibilization, and the mixture was infusibilized.

Example 7

A carbon catalyst of Example 7 was obtained in the same manner as in Example 3 except that a mixture further containing 0.018 g of chromium chloride hexahydrate ($CrCl_3 \cdot 6H_2O$) was prepared before the infusibilization, and the mixture was infusibilized.

Example 8

A carbon catalyst of Example 8 was obtained in the same manner as in Example 2 except that a mixture further containing 0.06 g of boric acid ($B(HO)_3$) was prepared before the infusibilization, and the mixture was infusibilized.

Example 9

A carbon catalyst of Example 9 was obtained in the same manner as in Example 2 except that 2.0 g of 2-methylimidazole was used instead of 1.0 g of 2-methylimidazole.

Example 10

A carbon catalyst of Example 10 was obtained in the same manner as in Example 2 except that a mixture further containing 0.69 g of germanium (IV) chloride ($GeCl_4$) was prepared before the infusibilization, and the mixture was infusibilized.

Example 11

A carbon catalyst of Example 11 was obtained in the same manner as in Example 2 except that a mixture further containing 0.06 g of samarium chloride hexahydrate ($SmCl_3 \cdot 6H_2O$) was prepared before the infusibilization, and the mixture was infusibilized.

Example 12

A carbon catalyst of Example 12 was obtained in the same manner as in Example 2 except that a mixture further containing 0.06 g of neodymium chloride hexahydrate ($NdCl_2 \cdot 6H_2O$) was prepared before the infusibilization, and the mixture was infusibilized.

Example 13

A carbon catalyst of Example 13 was obtained in the same manner as in Example 2 except that a mixture further containing 0.06 g of lead nitrate hexahydrate ($Pb(NO_3)_2 \cdot 6H_2O$) was prepared before the infusibilization, and the mixture was infusibilized.

Example 14

A carbon catalyst of Example 14 was obtained in the same manner as in Example 2 except that a mixture further containing 0.075 g of gadolinium nitrate hexahydrate ($Gd(NO_3)_3 \cdot 6H_2O$) was prepared before the infusibilization, and the mixture was infusibilized.

Example 15

A carbon catalyst of Example 15 was obtained in the same manner as in Example 2 except that a mixture further containing 1.06 g of bismuth(III) chloride (BiCl$_3$) was prepared before the infusibilization, and the mixture was infusibilized.

Example 16

A carbon catalyst of Example 16 was obtained in the same manner as in Example 2 except that a mixture further containing 0.03 g of titanium nitride (TiN) was prepared before the infusibilization, and the mixture was infusibilized.

Example 17

A carbon catalyst of Example 17 was obtained in the same manner as in Example 2 except that a mixture further containing 0.48 g of silver chloride (AgCl) was prepared before the infusibilization, and the mixture was infusibilized.

Comparative Example 1

1.0 g of polyacrylonitrile (PAN), 1.0 g of 2-methylimidazole, 6.0 g of zinc chloride (ZnCl$_2$), and 30 g of dimethylformamide were mixed. The solvent was removed from the obtained mixture by drying. The dried mixture was heated in the atmosphere to be infusibilized at 250° C.

25 g of the infusibilized mixture, 0.03 g of iron(III) chloride hexahydrate (FeCl$_3$·6H$_2$O), and 105 g of dimethylformamide were mixed. The solvent was removed from the obtained mixture by drying.

The dried mixture was heated and kept at 1,100° C. for 1 hour under ordinary pressure in a nitrogen atmosphere to be carbonized. Dilute hydrochloric acid was added to the carbonized material obtained by the carbonization, followed by stirring. After that, the suspension containing the carbonized material was filtered through use of a membrane filter, and the carbonized material was washed with distilled water until the filtrate became neutral. Thus, metal removal treatment through washing using an acid was performed.

The carbonized material after the metal removal treatment was pulverized with a pulverizer until the average particle diameter thereof became 1 μm or less. Thus, the pulverized carbonized material was obtained as a carbon catalyst of Comparative Example 1.

Comparative Example 2

A carbon catalyst of Comparative Example 2 was obtained in the same manner as in Comparative Example 1 except that the carbonization was performed at 1,200° C. instead of 1,100° C.

Comparative Example 3

A carbon catalyst of Comparative Example 3 was obtained in the same manner as in Comparative Example 1 except that a mixture further containing 0.018 g of chromium chloride hexahydrate (CrCl$_3$·6H$_2$O) was prepared before the infusibilization, and the mixture was infusibilized.

Comparative Example 4

A carbon catalyst of Comparative Example 4 was obtained in the same manner as in Comparative Example 2 except that a mixture further containing 0.018 g of chromium chloride hexahydrate (CrCl$_3$·6H$_2$O) was prepared before the infusibilization, and the mixture was infusibilized.

Next, each of the carbon catalysts obtained as described above was subjected to analysis as described below. The weight of a used carbon catalyst described in the description of each of the following analyses refers to the weight of the carbon catalyst that has been subjected to heat treatment at 80° C. for 3 hours in vacuum.

[Powder X-Ray Diffraction]

Powder XRD measurement of the carbon catalyst was performed. When a carbon (002) diffraction line was analyzed in a diffraction pattern obtained by powder XRD, correction was made based on "Procedure for the measurements of lattice parameters and crystallite sizes of carbon materials by X-ray diffraction" by "The 117 Committee of the Japan Society for the Promotion of Sciences." The details of the correction are described in literature (Carbon, No. 221, pp. 52-60 (2006)).

In the "Procedure for the measurements of lattice parameters and crystallite sizes of carbon materials by X-ray diffraction," correction is made by dividing a measurement intensity at each measurement angle by a correction factor FCT=L·P·A·Fc$^2$ at each measurement angle calculated in advance. In this case, L=1/(sin$^2$ θ·cos θ), P=(1+cos$^2$ 2θ·cos$^2$ 2θ')/(1+cos$^2$ 2θ'), and A=[1−sin 2θ/2μ'b$_r$][1−exp(−2μ't/sin θ)]+(2t·cos θ/b$_r$)exp(−2μ't/sin θ) are established.

In the above-mentioned expressions, e represents an angle of a goniometer, and θ' represents a diffraction angle (0°) of a monochromator crystal when a counter monochromator is used. μ' represents an apparent linear absorption coefficient (0.4219 mm$^{-1}$) of a sample, and b$_r$ represents an irradiation width of an X-ray on a sample surface and is given by the following expression: B$_r$=R sin β. In this case, β represents a divergence slit width (⅔°), and R represents a goniometer radius (285 mm).

In addition, Fc represents an atom scattering factor, and is obtained by the following expression: Fc=(2.26069·exp(−0.226907·s$^2$)+1.56165·exp(−0.00656665·s$^2$)+1.050 75·exp (−0.0975618·s$^2$)+0.839259·exp(−0.555949·s$^2$)+0.286977).

In this case, s=(sin θ)/λ is established.

In the obtained XRD pattern, a diffraction peak in the vicinity of a diffraction angle 2θ of 26° was subjected to peak separation. The peak separation was performed by approximating the overlapping diffraction peaks through superimposition onto a Gaussian basic waveform. The diffraction pattern subjected to background correction was subjected to fitting by optimizing a peak intensity, a peak full width at half maximum, and a peak position of a Gaussian function serving as each component as parameters. The background correction was performed by defining, as a background, a straight line connecting the vicinity of a diffraction angle (2θ) of from 10° to 20° to the vicinity of a diffraction angle (2θ) of from 30° to 40° and subtracting the background from each diffraction intensity.

The peak separation was performed by separating a diffraction peak in the vicinity of a diffraction angle 2θ of 26° (diffraction peak having a peak top in the vicinity of a diffraction angle 2θ of 26°) into at least one diffraction peak of the following three diffraction peaks: f$_{broad}$, f$_{middle}$, and f$_{narrow}$.

More specifically, the peak separation was performed by the following procedure. In the X-ray diffraction pattern using a CuKα ray subjected to the background correction, the diffraction peak having a peak top in the vicinity of a diffraction angle 2θ of 26° was superimposed onto a Gaussian basic waveform to be approximated, to thereby optimize a peak intensity, a peak full width at half maximum, and a peak position, and at least one peak of the three diffraction peaks included in the above-mentioned diffraction peak (e.g., when two or more diffraction peaks are included in the above-mentioned diffraction peak, each of the two or more overlapping diffraction peaks) was subjected to curve fitting, to thereby perform peak separation.

The curve fitting was performed so that a residual sum of squares became smallest. A residual square refers to a square of a residual error at each measured diffraction angle, and the residual sum of squares refers to a sum of residual squares. In addition, the residual error refers to a difference between the intensity of the diffraction peak having a peak top in the vicinity of a diffraction angle 2θ of 26° in the corrected X-ray diffraction pattern using a CuKα ray and the sum of intensities of at least one diffraction peak of the three diffraction peaks ($f_{broad}$, $f_{middle}$, and $f_{narrow}$) obtained by the separation. Through such peak separation, at least one diffraction peak of the above-mentioned three diffraction peaks $f_{broad}$, $f_{middle}$, and $f_{narrow}$ was obtained.

As examples of the above-mentioned peak separation, an XRD pattern of the carbon catalyst obtained in Example 1 is shown in FIG. 1A, and an XRD pattern of the carbon catalyst obtained in Example 2 is shown in FIG. 1B. In FIG. 1A and FIG. 1B, the horizontal axis represents a diffraction angle 2θ (°), and the vertical axis represents an intensity.

As shown in FIG. 1A, through peak separation of the diffraction peak in the vicinity of a diffraction angle 2θ of 26°, two diffraction peaks $f_{broad}$ and $f_{middle}$ of a low-crystalline component were obtained in the carbon catalyst obtained in Example 1. In addition, as shown in FIG. 1B, through peak separation of the diffraction peak in the vicinity of a diffraction angle 2θ of 26°, one diffraction peak $f_{broad}$ of a low-crystalline component was obtained in the carbon catalyst obtained in Example 2.

In the above-mentioned peak separation, as shown in FIG. 1C, through peak separation of the diffraction peak in the vicinity of a diffraction angle 2θ of 26θ, two diffraction peaks $f_{broad}$ and $f_{middle}$ of a low-crystalline component and one diffraction peak $f_{narrow}$ of a high-crystalline component may be obtained.

Then, the broad peak $f_{broad}$ obtained by the above-mentioned peak separation was analyzed to calculate a crystallite size Lc. Specifically, the crystallite size Lc was calculated by substituting a Bragg angle of the broad peak $f_{broad}$ obtained through the peak separation into the following Scherrer equation: $Lc = K\lambda/\beta \cos\theta$. In the Scherrer equation, K represents a Scherrer constant (0.94), λ represents a wavelength (0.15418 nm) of a CuKα ray, β represents a full width at half maximum (radian) of the broad peak $f_{broad}$, and θ represents a Bragg angle (radian) of the broad peak $f_{broad}$.

[Temperature Programmed Desorption Method]

A CO desorption amount and a $CO_2$ desorption amount from the carbon catalyst were measured by the TPD. Specifically, the carbon catalyst was installed in a temperature programmed desorption device (manufactured by MicrotracBEL Corp.), and subjected to heat treatment in high vacuum to desorb a surface functional group of the carbon catalyst. Then, oxygen was adsorbed to the surface of the carbon catalyst, and carrier gas (He) was circulated at 20 mL/min to heat the carbon catalyst. The desorbed gas was measured with a quadrupole mass spectrometer (QMS).

Specifically, first, 0.05 g of the carbon catalyst was filled into a center portion of a reaction tube made of quartz and set in the temperature programmed desorption device. Helium (He) gas was circulated through the device, and the inside of the device was kept at 25° C. for 120 minutes, to thereby stabilize the device. After that, the carbon catalyst was heated so that the temperature was increased from 25° C. to 1,200° C. at a temperature increase rate of 10° C./min. During the increase in temperature, helium (He) gas was circulated at 20 mL/min, and desorbed gas was detected. A correlation between the temperature (horizontal axis) and the detection intensity (vertical axis) was recorded.

Then, the amount of the gas desorbed within a temperature range of from 650° C. to 1,200° C. was determined. Specifically, an integral value of detection intensities (detection intensity area) of the gas within a temperature range of from 650° C. to 1,200° C. was calculated.

Meanwhile, a calibration curve representing a correlation between the release amounts of carbon monoxide (mass number: 28), carbon dioxide (carbon number: 44), and nitrogen (mass number: 14), and the detection intensity area was obtained through use of mixed gas of carbon monoxide and helium (carbon monoxide: 10 vol.), mixed gas of carbon dioxide and helium (carbon dioxide: 10 vol %), and nitrogen gas (nitrogen: 100 vol %) as reference gas.

Then, the desorption amounts (release amounts) of carbon monoxide and carbon dioxide from the carbon catalyst were determined based on the detection intensity area obtained by the measurement and the calibration curve. Specifically, the desorption amounts (release amounts per weight of the carbon catalyst) of carbon monoxide and carbon dioxide from the carbon catalyst were calculated by dividing the obtained release amounts of carbon monoxide and carbon dioxide by the weight of the carbon catalyst used for the measurement. Regarding carbon monoxide, the release amount of only carbon monoxide was determined by subtracting the release amount of mass number 14 (nitrogen) from the release amount of mass number 28.

[Raman Spectroscopy]

The carbon catalyst was analyzed by Raman spectroscopy. A Raman spectrum was measured through use of a HORIBA microscopic laser Raman spectrometer (LabRAM, HORIBA Jobin Yvon). A laser used for the measurement had an excitation wavelength of 532 nm and an output of 50 mW. Measurement was performed under the conditions of exposure of 90 seconds and a number of scans of one through a neutral density filter D3, to obtain a Raman spectrum.

In the obtained Raman spectrum, a G band in the vicinity of 1,580 $cm^{-1}$ and a D band in the vicinity of 1,360 $cm^{-1}$ were identified. Further, a half width ($cm^{-1}$) of the G band, a half width ($cm^{-1}$) of the D band, and an $I_v/I_g$ ratio were obtained based on an intensity $I_g$ of the G band (intensity of a peak top of the G band), an intensity $I_d$ of the D band (intensity of a peak top of the D band), and a minimum intensity $I_v$ between the G band and the D band.

As one example of the above-mentioned Raman spectrum, a result obtained by analyzing a Raman spectrum obtained by Raman spectroscopy of the carbon catalyst obtained in Example 1 is shown in FIG. 2. In FIG. 2, the horizontal axis represents a wave number ($cm^{-1}$). The vertical axis represents an intensity. The broken line represents a background. $A_d$ represents a wave number ($cm^{-1}$) corresponding to a peak top of the D band. $B_d$ represents a wave number ($cm^{-1}$) corresponding to a Raman spectrum that exhibits an intensity of a half of the D band intensity $I_d$ on a wave number side lower than $A_d$. $A_g$ represents a wave number ($cm^{-1}$) corresponding to a peak top of the G band. $B_g$ represents a wave number ($cm^{-1}$) corresponding to a Raman spectrum that exhibits an intensity of a half of the G band intensity $I_g$ on a wave number side higher than $A_g$.

[Specific Surface Area]

A specific surface area of the carbon catalyst was measured by a BET method using nitrogen gas through use of a specific surface area/pore distribution measurement device (Tristar 3000, manufactured by Shimadzu Corporation). Specifically, first, 0.1 g of the carbon catalyst was kept at 100° C. and $6.7 \times 10^{-2}$ Pa for 3 hours, to thereby remove moisture adsorbing to the carbon catalyst. Then, a specific surface area (m$^2$/g) of the carbon catalyst was obtained from a nitrogen adsorption isotherm at 77 K by the BET method. The nitrogen adsorption isotherm at 77 K was obtained by measuring a change in nitrogen adsorption amount to the carbon catalyst in association with a change in pressure of the nitrogen gas at a temperature of 77 K.

[X-Ray Photoelectron Spectroscopy]

The carbon catalyst was analyzed by the XPS. Specifically, a photoelectron spectrum from each core level of a carbon atom and a nitrogen atom on the surface of the carbon catalyst was measured through use of an X-ray photoelectron spectroscope (AXIS Nova, manufactured by KPATOS). As an X-ray source, an AlKα line (10 mA, 15 kV, Pass energy: 40 eV) was used. In the obtained photoelectron spectrum, binding energy was corrected so that the peak top of the $C_{1s}$ peak derived from the 1s orbital of the carbon atom was located at 284.5 eV.

The element concentrations (atm %) of the nitrogen atom and the carbon atom on the surface of the carbon catalyst were obtained based on a peak area and a detection sensitivity coefficient of each spectrum. Then, a value obtained by dividing the nitrogen atom concentration (atm %) by the carbon atom concentration (atm %) was multiplied by 100, to thereby calculate a N/C ratio (%).

[Elemental Analysis]

The carbon catalyst was subjected to elemental analysis. Specifically, a nitrogen content of the carbon catalyst was measured by a combustion method through use of an organic trace elemental analysis device (2400II, manufactured by PerkinElmer Co., Ltd.). 2 mg of the carbon catalyst was analyzed through use of helium as carrier gas under the conditions of a combustion tube temperature of 980° C. and a reduction tube temperature of 640° C. Then, a value obtained by dividing the weight of nitrogen by the total weight of the carbon catalyst was multiplied by 100, to thereby calculate a nitrogen atom content (wt %).

[Average Particle Diameter]

The carbon catalyst was measured for an average particle diameter. Specifically, a particle diameter of the carbon catalyst was measured by a laser diffraction method through use of a nanoparticle diameter distribution measurement device (SALD-7100H, manufactured by Shimadzu Corporation). More specifically, first, one drop of a surfactant was added to 10 mg of the carbon catalyst, and 40 g of distilled water was added to the mixture, to thereby prepare a suspension. After that, the suspension was subjected to homogenizer treatment for 20 minutes to prepare a dispersion. The prepared dispersion was dropped to a flow cell in which distilled water was circulated until a maximum value of a diffraction/scattering light intensity became 50±5, to thereby measure a particle diameter. A median diameter (d50) determined from the obtained particle diameter distribution (volume distribution) was obtained as an average particle diameter. Out of particle diameters in the obtained particle diameter distribution (volume distribution) each having a frequency (%) of 0.001 or more, a maximum value was defined as a maximum particle diameter, and a minimum value was defined as a minimum particle diameter.

[Catalytic Activity and Durability]

The carbon catalyst was evaluated for catalytic activity and durability (oxidation resistance) through use of a rotating ring disk electrode device (RRDE-3A rotating ring disk electrode device ver. 1.2, manufactured by BAS Inc.) and a dual electrochemical analyzer (CHI700C, manufactured by ALS Corporation). Specifically, first, a tripolar rotating ring disk electrode device including a working electrode containing the carbon catalyst was manufactured. Specifically, 5 mg of the carbon catalyst, 50 μL of 5 Nafion (trademark) (Nafion manufactured by Sigma-Aldrich, perfluorinated ion exchange resin, 5% solution (product number: 510211)), 400 μL of water, and 100 μL of isopropyl alcohol were mixed to prepare a slurry. Then, the slurry was subjected to ultrasonic treatment for 10 minutes, followed by homogenizer treatment for 2 minutes. The obtained slurry was applied onto a working electrode (ring disk electrode for RRDE-3A, platinum ring-gold disk electrode, disk diameter of 4 mm, manufactured by BAS Inc.) so that the application amount of the carbon catalyst became 0.1 mg/cm$^2$, followed by drying, to thereby manufacture a working electrode containing the carbon catalyst.

In addition, a platinum electrode (Pt counter electrode of 23 cm, manufactured by BAS Inc.) was used as a counter electrode, and a reversible hydrogen electrode (RHE) (storage type reversible hydrogen electrode manufactured by EC Frontier Co., Ltd.) was used as a reference electrode. Thus, a rotating ring disk electrode device including the working electrode containing the carbon catalyst, the platinum electrode serving as the counter electrode, and the reversible hydrogen electrode (RHE) serving as the reference electrode, was obtained. In addition, as an electrolytic solution, a 0.1 M perchloric acid aqueous solution was used.

The catalytic activity (initial catalytic activity) of the carbon catalyst at the time of starting (Beginning Of Life: BOL) the durability test (potential retention test) using the rotating ring disk electrode device was measured.

Specifically, cyclic voltammetry (CV) was performed through use of the tripolar rotating ring disk electrode device including the working electrode containing the carbon catalyst. In the CV, first, nitrogen bubbling was performed for 10 minutes to remove oxygen in the electrolytic solution.

Then, CV measurement was performed in accordance with the following protocol. Specifically, potential sweep was performed for five cycles (one cycle: 1.0 V→0.0 V→1.0 V) at a sweep speed of 50 mV/sec within a potential range of from 0.0 V to 1.0 V (vs. normal hydrogen electrode (NHE)), and a current was recorded as a function of a potential. A CV area (BOL-CV area) (A·sec) at the time of starting of the durability test was obtained by integration based on the obtained voltammogram at the fifth cycle. In the obtained voltammogram, signs were assigned to numerical values so that a reduction current had a negative value, and an oxidation current had a positive value.

Figure 3:
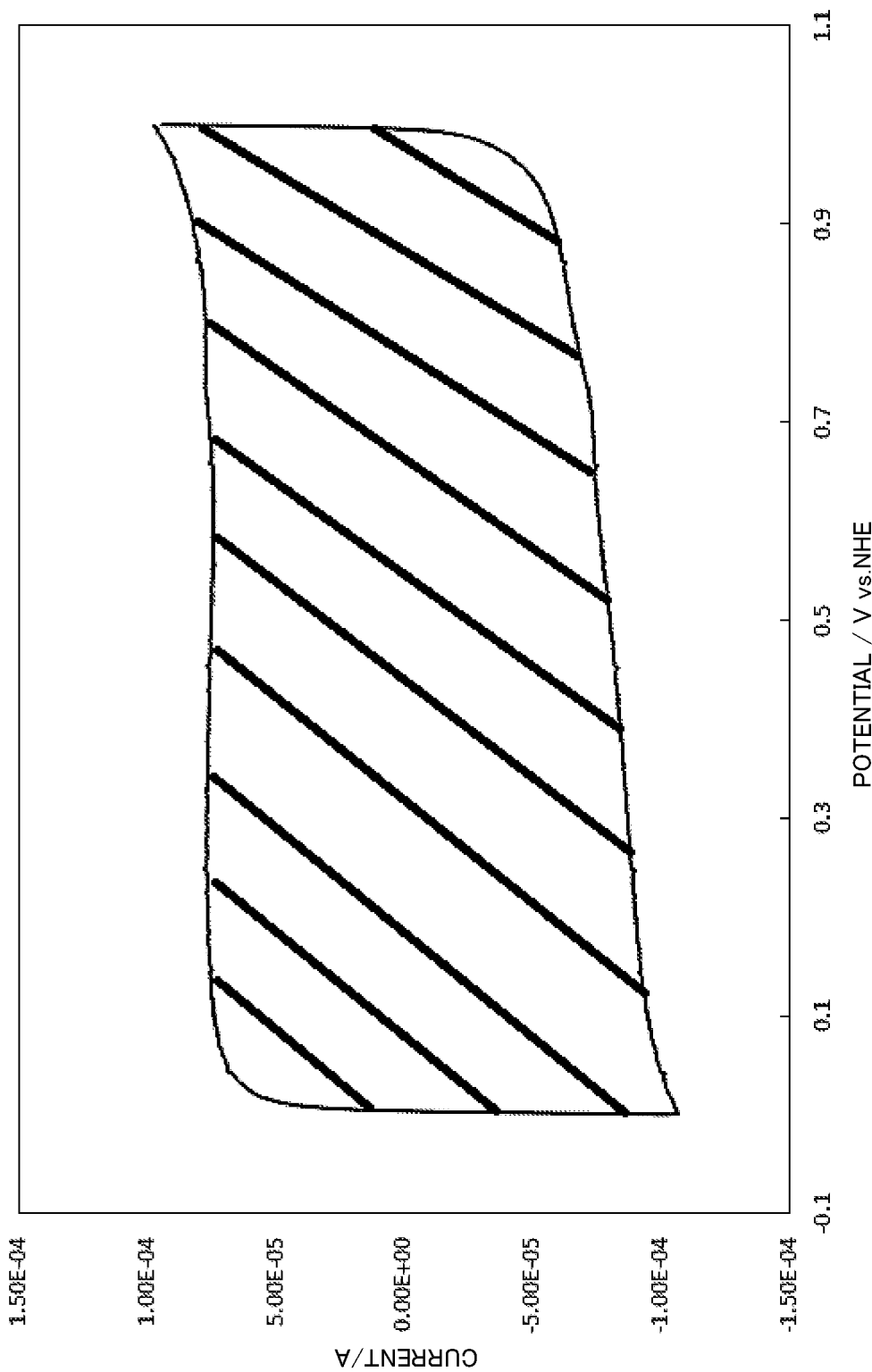
FIG. 3 is an explanatory diagram for showing a result obtained by analyzing a voltammogram obtained through use of a rotating ring disk electrode device including a working electrode containing the carbon catalyst obtained in Example 1 according to the one embodiment of the present invention.

As one example of the above-mentioned voltammogram, the voltammogram at the fifth cycle obtained through use of the rotating ring disk electrode device including the working electrode containing the carbon catalyst obtained in Example 1 is shown in FIG. 3. In FIG. 3, the horizontal axis represents a potential (V vs. NHE), and the vertical axis represents a current (A). In the voltammogram shown in FIG. 3, the area of a hatched region, which was enclosed by a curve at the time of sweep application of a potential of from 1.0 V to 0.0 V and a curve at the time of sweep application of a potential of from 0.0 V to 1.0 V, was obtained as the CV area (A·sec) by integration.

In addition, after the CV measurement, the electrodes were rotated at a rotation speed of 1,600 rpm, and a current was recorded as a function of a potential when potential sweep was performed at a sweep speed of 20 mV/sec (BOL-$N_2$-LSV). After that, oxygen bubbling was further performed for 10 minutes, to thereby fill saturated oxygen into the electrolytic solution. After that, the electrodes were rotated at a rotation speed of 1,600 rpm, and a current was recorded as a function of a potential when potential sweep was performed at a sweep speed of 20 mV/sec (BOL-$O_2$-LSV). Then, BOL-$N_2$-LSV was subtracted from BOL-$O_2$-LSV, and the current (mA) of the vertical axis was divided by the working electrode disk area ($cm^2$), to thereby obtain an oxygen reduction voltammogram with the vertical axis representing a current density (mA/$cm^2$).

Figure 4A:
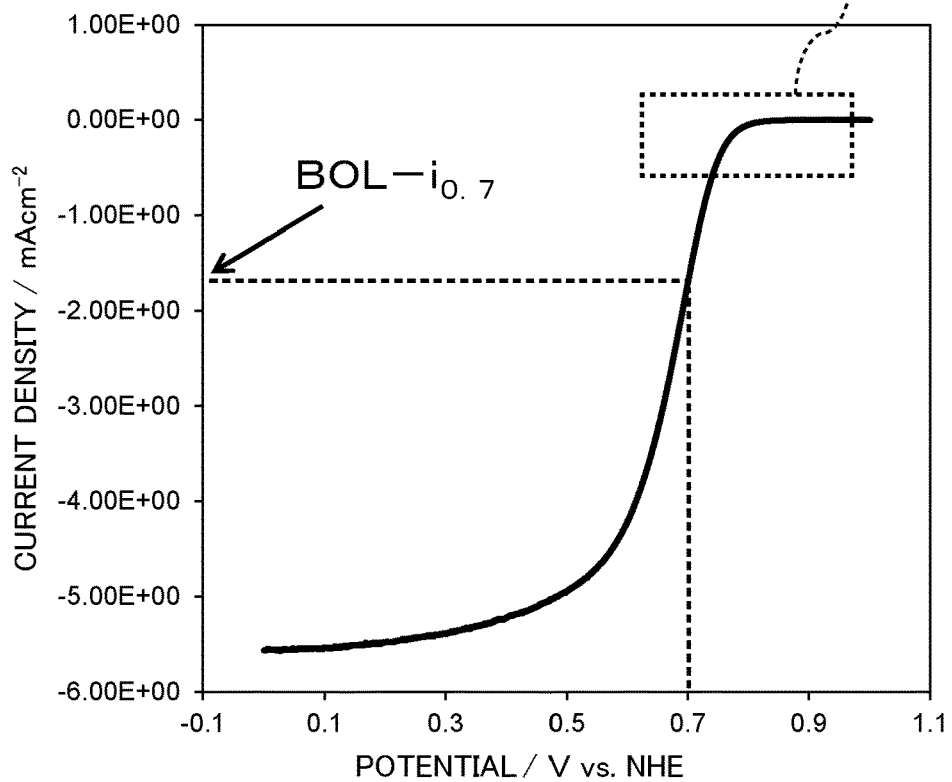
FIG. 4A is an explanatory diagram for showing an oxygen reduction voltammogram obtained through use of the rotating ring disk electrode device including the working electrode containing the carbon catalyst obtained in Example 1 according to the one embodiment of the present invention.
Figure 4B:
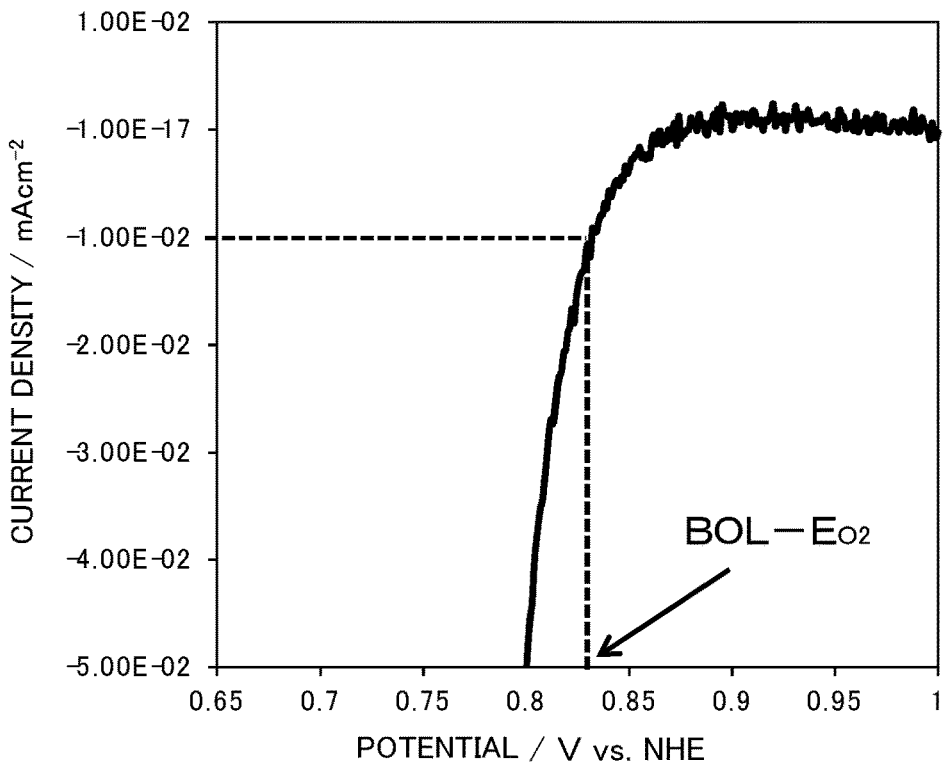
FIG. 4B is an explanatory diagram for showing a portion X enclosed by the dotted line of FIG. 4A in an enlarged manner.

As one example of the oxygen reduction voltammogram, an oxygen reduction voltammogram obtained through use of the rotating ring disk electrode device including the working electrode containing the carbon catalyst obtained in Example 1 is shown in each of FIG. 4A and FIG. 4B. A portion X enclosed by the dotted line of FIG. 4A is shown in FIG. 4B in an enlarged manner. In FIG. 4A and FIG. 4B, the horizontal axis represents a potential (V vs. NHE), and the vertical axis represents a current density (mA/$cm^2$).

From the oxygen reduction voltammogram as shown in each of FIG. 4A and FIG. 4B, as an indicator for indicating catalytic activity at the time of starting of the durability test of the carbon catalyst, a voltage (oxygen reduction-starting potential BOL-$E_{O2}$) (V vs. NHE) at a time when a reduction current of −10 μA/$cm^2$ flows and a current density BOL-$i_{0.7}$ (mA/$cm^2$) at a time when a voltage of 0.7 V (vs. NHE) is applied were recorded.

Then, the durability test (potential retention test) was performed. Specifically, the electrolytic solution was replaced by a fresh 0.1M perchloric acid aqueous solution, and oxygen bubbling was performed for 10 minutes, to thereby fill the electrolytic solution with saturated oxygen. Then, the electrodes were rotated at a rotation speed of 1,600 rpm, and a voltage of 1.2 V (vs. RHE) was applied. This state was kept for 10 minutes, and a current during this period was recorded as a function of a potential.

After that, the catalytic activity of the carbon catalyst at the time of ending (End Of Life: EOL) the durability test was measured. Specifically, nitrogen bubbling was performed for 10 minutes without replacing the electrolytic solution, to thereby remove oxygen in the electrolytic solution.

Then, CV measurement was performed in accordance with the following protocol in the same manner as in the measurement at a time of the start of the durability test. Specifically, potential sweep was performed for five cycles (one cycle: 1.0 V→0.0 V→1.0 V) at a sweep speed of 50 mV/sec within a potential range of from 0.0 V to 1.0 V (vs. normal hydrogen electrode (NHE)), and a current was recorded as a function of a potential.

Here, a CV area (EOL-CV area) (A·sec) at the time of ending the durability test was obtained by integration based on the obtained voltammogram at the fifth cycle. Further, a CV area increase amount (A·sec) was calculated by subtracting the BOL-CV area from the EOL-CV area and recorded as an indicator of oxidation resistance.

In addition, after the CV measurement, the electrodes were rotated at a rotation speed of 1,600 rpm, and a current density was recorded as a function of a potential when potential sweep was performed at a sweep speed of 20 mV/sec (EOL-$N_2$-LSV). After that, oxygen bubbling was further performed for 10 minutes, to thereby fill saturated oxygen into the electrolytic solution. After that, the electrodes were rotated at a rotation speed of 1,600 rpm, and a current density was recorded as a function of a potential when potential sweep was performed at a sweep speed of 20 mV/sec (EOL-$O_2$-LSV). Then, BOL-$N_2$-LSV was subtracted from BOL-$O_2$-LSV, and the current (mA) of the vertical axis was divided by the working electrode area ($cm^2$), to thereby obtain an oxygen reduction voltammogram with the vertical axis representing a current density (mA/$cm^2$).

From the oxygen reduction voltammogram at the time of ending the durability test obtained as described above, a voltage (oxygen reduction-starting potential EOL-$E_{O2}$) (V vs. NHE) at a time when a reduction current of −10 μA/$cm^2$ flows and a current density EOL-$i_{0.7}$ (mA/$cm^2$) at a time when a voltage of 0.7 V (vs. NHE) is applied were recorded. Then, a value, which was obtained by dividing the current density EOL-$i_{0.7}$ (mA/$cm^2$) at the time of ending the durability test by BOL-$i_{0.7}$ (mA/$cm^2$) at the time of starting the durability test, was multiplied by 100, to thereby calculate a current density $i_{0.7}$ maintenance ratio (%).

Results

The results obtained by evaluating the carbon catalysts obtained in Examples 1 to 17 and Comparative Examples 1 to 4 for the following are shown in FIG. 5: an oxygen reduction-starting potential $E_{O2}$ (V) and a current density $i_{0.7}$ (mA/$cm^2$) at the time of starting the durability test indicating initial catalytic activity; a current density $i_{0.7}$ maintenance ratio (%) and a CV area increase amount (A·sec) indicating durability; a crystallite size Lc (nm) measured by the XRD; a CO desorption amount, a $CO_2$ desorption amount, and a (CO+$CO_2$) desorption amount measured by the TPD; an $I_v/I_g$ ratio, a D band half width ($cm^{-1}$), and a G band half width ($cm^{-1}$) measured by Raman spectroscopy; and a BET specific surface area ($m^2$/g).

As shown in FIG. 5, in the carbon catalysts of Comparative Examples 1 and 3, the oxygen reduction-starting potential $E_{O2}$ was from 0.827 V to 0.828 V, and the current density $i_{0.7}$ was from −1.71 to −1.72 at the time of starting the durability test, but the current density $i_{0.7}$ maintenance ratio was from 87.1% to 87.8%, and the CV area increase amount was from $6.37×10^{-5}$ A·sec to $6.42×10^{-5}$ A·sec in the durability test. Specifically, in the carbon catalysts of Comparative Examples 1 and 3, the catalytic activity at the time of starting the durability test was relatively high, but the durability was low.

Meanwhile, in the carbon catalysts of Comparative Examples 2 and 4, the current density $i_{0.7}$ maintenance ratio was from 92.9% to 93.8%, and the CV area increase amount was from $5.81×10^{-5}$ A·sec to $5.87×10^{-5}$ A·sec in the durability test, but the oxygen reduction-starting potential $E_{O2}$ was from 0.803 V to 0.804 V, and the current density $i_{0.7}$ was from −0.95 to −0.97 at the time of starting the durability test. Specifically, in the carbon catalysts of Comparative Examples 2 and 4, the durability was relatively high, but the catalytic activity at the time of starting the durability was low.

In contrast, in the carbon catalysts of Examples 1 to 17, the oxygen reduction-starting potential $E_{O2}$ was from 0.826 V to 0.837 V, and the current density $i_{0.7}$ was from −1.57 to −1.80 at the time of starting the durability test. Further, in the carbon catalysts of Examples 1 to 17, the current density $i_{0.7}$ maintenance ratio was from 90.6% to 93.7%, and the CV area increase amount was from $4.74×10^{-5}$ A·sec to $5.25×10^{-5}$ A·sec in the durability test. In particular, in the carbon catalysts of Examples 2 to 17, the current density $i_{0.7}$ maintenance ratio was from 91.8% to 93.7%, and the CV area increase amount was from $4.74 \times 10^{-5}$ A·sec to $4.96 \times 10^{-5}$ A·sec in the durability test.

Specifically, the carbon catalysts of Examples 1 to 17 had both characteristics of excellent catalytic activity and excellent durability. In particular, the carbon catalysts of Examples 2 to 17 were significantly excellent in durability.

In addition, the crystallite sizes Lc measured by the XRD of the carbon catalysts of Comparative Examples 1 and 3 were 1.01 nm or less, and those of the carbon catalysts of Comparative Examples 2 and 4 were 1.24 nm or more. In contrast, the crystallite sizes Lc measured by the XRD of the carbon catalysts of Examples 1 to 17 were from 0.98 nm to 1.13 nm.

In addition, the CO desorption amounts measured by the TPD of the carbon catalysts of Comparative Examples 1 to 3 were 2,150.0 μmol/g or more, and those of the carbon catalysts of Comparative Examples 2 and 4 were 552.0 μmol/g or less. In contrast, the CO desorption amounts measured by the TPD of the carbon catalysts of Examples 1 to 17 were 542.5 μmol/g or less.

In addition, the $CO_2$ desorption amounts measured by the TPD of the carbon catalysts of Comparative Examples 1 and 3 were 200.0 μmol/g or more, and those of the carbon catalysts of Comparative Examples 2 and 4 were 101.4 μmol/g or less. In contrast, the $CO_2$ desorption amounts measured by the TPD of the carbon catalysts of Examples 1 to 17 were 85.2 μmol/g or less, and those of the carbon catalysts of Examples 2 to 17 were 54.0 μmol/g or less.

In addition, the ($CO+CO_2$) desorption amounts measured by the TPD of the carbon catalysts of Comparative Examples 1 and 3 were 2,350.0 μmol/g or more, and those of the carbon catalysts of Comparative Examples 2 and 4 were 653.4 μmol/g or less. In contrast, the ($CO+CO_2$) desorption amounts measured by the TPD of the carbon catalysts of Examples 1 to 17 were 618.2 μmol/g or less, and those of the carbon catalysts of Examples 2 to 17 were 551.7 μmol/g or less.

In addition, the $I_v/I_g$ ratios in Raman spectra of the carbon catalysts of Comparative Examples 1 to 4 were 0.50 or more. In contrast, the $I_v/I_g$ ratios in Raman spectra of the carbon catalysts of Examples 1 to 17 were from 0.31 to 0.48.

In addition, the D band half widths in Raman spectra of the carbon catalysts of Comparative Examples 1 to 4 were 180 $cm^{-1}$ or more. In contrast, the D band half widths in Raman spectra of the carbon catalysts of Examples 1 to 17 were 179 $cm^{-1}$ or less.

In addition, the G band half widths in Raman spectra of the carbon catalysts of Comparative Examples 1 to 4 were 81 cm or more. In contrast, the G band half widths in Raman spectra of the carbon catalysts of Examples 1 to 17 were 80 $cm^{-1}$ or less.

In addition, the BET specific surface areas of the carbon catalysts of Comparative Examples 1 to 4 were 1,332 $m^2/g$ to 1,371 $m^2/g$. In contrast, the BET specific surface areas of the carbon catalysts of Examples 1 to 17 were 1,232 $m^2/g$ to 1,680 $m^2/g$.

In addition, although not shown, the carbon catalysts of the Examples 1 to 17 each had a N/C ratio measured by the XPS of 2.0% or more, a nitrogen content measured by the elemental analysis of 2.3 wt % or more, a maximum particle diameter of 10.0 μm or less, and an average particle diameter of 0.60 μm or less.

[Manufacturing of Zinc Air Cell]

A battery electrode having a catalyst layer containing a carbon catalyst formed therein was manufactured. Specifically, first, 0.25 g of the carbon catalyst of Example 2 and an electrolyte solution were loaded into a sample bottle and treated in an ultrasonic bath for 10 minutes. After that, the resultant was stirred with a homogenizer at 25,000 rpm for 10 minutes, and further treated with an ultrasonic homogenizer at an output of 30 W and a frequency of 20 kHz for 10 minutes, to thereby obtain a slurry-like composition for a catalyst layer containing the carbon catalyst uniformly dispersed therein.

The obtained slurry-like composition for a catalyst layer was applied onto a region having an area of 9 $cm^2$ of a gas diffusion layer ("29BC", manufactured by SGL Carbon Co., Ltd.) (3.0 cm×3.0 cm) so that the content of the carbon catalyst per unit area of a battery electrode became 1.5 $mg/cm^2$, followed by drying, to thereby form a catalyst layer on the gas diffusion layer. Thus, a battery electrode having the catalyst layer containing the carbon catalyst formed therein was obtained. In addition, for comparison, a battery electrode was obtained in the same manner except that highly conductive carbon black (Ketjen black manufactured by Lion Corporation) was used instead of the carbon catalyst.

Then, a zinc air cell including the battery electrode obtained as described above was manufactured. Specifically, two aluminum laminates (manufactured by Dai Nippon Printing Co., Ltd.) each cut out to a size of 8 cm-6 cm were prepared. Part of one of the aluminum laminates was cut out to form a square window portion (2 cm×2 cm).

In addition, a nickel plate (thickness: 0.1 mm, manufactured by The Nilaco Corporation) cut out to a size of 3 cm×9 cm was prepared. A portion having a size of 2 cm×6 cm was cut off from the nickel plate, to thereby obtain an L-shaped nickel plate including a square base portion (3 cm×3 cm) and a rectangular terminal portion (1 cm×6 cm) extending from the base portion.

Then, the nickel plate was stacked on the one aluminum laminate so that the base portion of the nickel plate was exposed from the window portion of the one aluminum laminate. Further, nine holes (each having a diameter of 3 mm) that were regularly arranged were formed (three holes× three holes) as air intake holes in a portion (2 cm×2 cm) of the base portion of the nickel plate, which was exposed from the window portion of the aluminum laminate.

After that, the battery electrode was stacked on the base portion of the nickel plate so that a surface of the base portion of the nickel plate on an opposite side to the aluminum laminate and the gas diffusion layer of the battery electrode (3 cm×3 cm) obtained as described above were brought into contact with each other. Further, a thermal welding tape (manufactured by Dai Nippon Printing Co., Ltd.) was arranged so as to extend over the surrounding aluminum laminate from a frame-shaped outer peripheral portion having a width of 0.5 cm of a surface of the battery electrode on an opposite side to the nickel plate (that is, the surface of the catalyst layer). Through thermal welding of the thermal welding tape, the battery electrode, the nickel plate, and the aluminum laminate were integrated to obtain a positive electrode (air electrode).

Meanwhile, a portion having a size of 2 cm×6 cm was cut off from a copper foil (thickness: 20 μm, manufactured by Hohsen Corp.) cut out to a size of 3 cm×9 cm in the same manner as in the nickel plate, to thereby obtain an L-shaped copper foil including a square base portion (3 cm×3 cm) and a rectangular terminal portion (1 cm×6 cm) extending from the base portion. Then, the base portion of the copper foil and a zinc plate (thickness: 0.5 mm, manufactured by The Nilaco Corporation) cut out to a size of 3 cm×3 cm were welded to each other with an ultrasonic welding machine, to thereby obtain a zinc negative electrode.

After that, a cellulose separator (TF40-50, manufactured by Nippon Kodoshi Corporation) cut out to a size of 3 cm×3 cm was stacked on the surface of the catalyst layer of the positive electrode. Then, the zinc negative electrode was stacked on the cellulose separator so that a surface of the cellulose separator on an opposite side to the positive electrode and a surface of the zinc plate of the zinc negative electrode were brought into contact with each other. In this case, the nickel plate and the copper foil were arranged so that the terminal portion of the nickel plate and the terminal portion of the copper coil did not overlap with each other.

Further, the other aluminum laminate (8 cm×6 cm) was stacked on a surface of the zinc negative electrode on an opposite side to the cellulose separator (that is, the surface of the copper foil). Then, three sides out of four sides of the pair of stacked aluminum laminates were subjected to thermal welding, to thereby form an aluminum laminate bag opened on one side.

That is, in the aluminum laminate bag, the L-shaped nickel plate, the gas diffusion layer of the battery electrode, the catalyst layer of the battery electrode, the cellulose separator, the zinc plate of the zinc electrode, and the L-shaped copper foil of the zinc electrode were arranged in the stated order from the one aluminum laminate having the window portion formed therein to the other aluminum laminate.

Further, a 4 mol/L potassium hydroxide (manufactured by Hayashi Pure Chemical Ind., Ltd.) aqueous solution serving as an electrolytic solution was injected through the opening of the aluminum laminate bag. Finally, the opening of the aluminum laminate bag was closed by thermal welding to obtain a zinc air battery cell. The terminal portion of the nickel plate extending outside of the cell was utilized as a positive electrode terminal, and the terminal portion of the copper foil was utilized as a negative electrode terminal.

[Manufacturing of Magnesium Air Cell]

A magnesium air cell including the battery electrode obtained as described above was manufactured in the same manner as in the above-mentioned zinc air electrode. Specifically, an L-shaped magnesium alloy plate including a square base portion (3 cm×3 cm) and a rectangular terminal portion (1 cm×6 cm) extending from the base portion was used as a magnesium negative electrode instead of the above-mentioned zinc negative electrode, to thereby form an aluminum laminate bag having one side opened, in which the L-shaped nickel plate, the gas diffusion layer of the battery electrode, the catalyst layer of the battery electrode, the cellulose separator, and the magnesium negative electrode were arranged in the stated order from the one aluminum laminate having the window portion formed therein to the other aluminum laminate.

Then, a 4 mol/L sodium chloride (manufactured by Kanto Chemical Industry Co., Ltd.) aqueous solution serving as an electrolytic solution was injected through the opening of the aluminum laminate bag. Finally, the opening of the aluminum laminate bag was closed by thermal welding to obtain a magnesium air battery cell. The terminal portion of the nickel plate extending outside of the cell was utilized as a positive electrode terminal, and the terminal portion of the magnesium alloy plate was utilized as a negative electrode terminal.

[Evaluation of Characteristics of Air Cell]

A maximum output density of each of the zinc air cell and the magnesium air cell manufactured as described above was measured with a cell voltage of 0.5 V being set as a cut-off voltage through use of a charge/discharge device (HJ0505 SM8A, manufactured by HOKUTO DENKO CORPORATION).

The configurations of the positive electrode and the negative electrode of each of the zinc air cell and the magnesium air cell and the results obtained by measuring the maximum output density (mW/cm$^2$) thereof are shown in FIG. 6. As shown in FIG. 6, in any of the zinc air cell and the magnesium air cell, a significantly high maximum output density was obtained in the air cell including a positive electrode containing a carbon catalyst, compared to that of the air cell including a positive electrode containing carbon black. Specifically, it was confirmed that the carbon catalyst exhibited excellent catalytic activity in the air cell.

In addition, the durability of each of the zinc air cell and the magnesium air cell was evaluated. Specifically, the air cells manufactured as described above were subjected to an output characteristics test. Then, constant current discharge was performed at a current value of 10 mA/cm$^2$ up to 30% of a theoretical value. After that, the output characteristics test was performed again. Then, a value obtained by dividing an output value after the constant current discharge by an output value before the constant current discharge was multiplied by 100, to thereby calculate an output maintenance ratio (%).

The configurations of the positive electrode and the negative electrode of each of the zinc air cell and the magnesium air cell and the results obtained by measuring the output maintenance ratio (%) thereof are shown in FIG. 7. As shown in FIG. 7, in any of the zinc air cell and the magnesium air cell, a significantly high output maintenance ratio was obtained in the air cell including a positive electrode containing a carbon catalyst, compared to that of the air cell including a positive electrode containing carbon black. Specifically, it was confirmed that the carbon catalyst exhibited excellent durability in the air cell.

The invention claimed is:

1. A carbon catalyst comprising
a carrier comprising a carbon structure that has a crystallite size Lc falling within a range of 0.80 nm or more and 1.20 nm or less calculated through use of a Bragg angle of a diffraction peak $f_{broad}$ at a diffraction angle 2θ of 24.00±4.00 obtained by separating a diffraction peak in a vicinity of a diffraction angle 2θ of 26° in an X-ray diffraction pattern obtained by powder X-ray diffraction using a CuKα ray, and that exhibits:
a carbon dioxide desorption amount in the temperature range from 650° C. to 1,200° C. of 86 μmol/g or less in a temperature programmed desorption method including measuring a carbon dioxide desorption amount in the temperature range from 25° C. to 1,200° C., and
an $I_v$ to $I_g$ ratio of 0.30 or more and 0.49 or less, wherein $I_v$ is a minimum intensity in a Raman spectrum obtained by Raman spectroscopy between 1,580 cm$^{-1}$ and 1,360 cm$^{-1}$, and $I_g$ is an intensity in a vicinity of 1,580 cm$^{-1}$ in the Raman spectrum, and
one or more metals selected from the group consisting of platinum, ruthenium, rhodium, palladium, iridium, gold and osmium carried on the carrier.

2. A carbon catalyst comprising
a carrier comprising a carbon structure that has a crystallite size Lc falling within a range of 0.80 nm or more and 1.20 nm or less calculated through use of a Bragg angle of a diffraction peak $f_{broad}$ at a diffraction angle 2θ of 24.0°±4.0° obtained by separating a diffraction peak in a vicinity of a diffraction angle 2θ of 26° in an X-ray diffraction pattern obtained by powder X-ray diffraction using a CuKα ray, and that exhibits:
a total of a carbon monoxide desorption amount and a carbon dioxide desorption amount in the temperature range from 650° C. to 1,200° C. of 620 µmol/g or less in a temperature programmed desorption method including measuring a carbon monoxide desorption amount and a carbon dioxide desorption amount in the temperature range from 25° C. to 1,200° C., and
an $I_v$ to $I_g$ ratio of 0.30 or more and 0.49 or less, wherein $I_v$ is a minimum intensity in a Raman spectrum obtained by Raman spectroscopy between 1,580 cm$^{-1}$ and 1,360 cm$^{-1}$, and $I_g$ is an intensity in a vicinity of 1,580 cm$^{-1}$ in the Raman spectrum, and
one or more metals selected from the group consisting of platinum, ruthenium, rhodium, palladium, iridium, gold and osmium carried on the carrier.

3. The carbon catalyst according to claim 1, wherein the carrier comprises the carbon structure that exhibits a total of a carbon monoxide desorption amount and a carbon dioxide desorption amount in the temperature range from 650° C. to 1,200° C. of 647 µmol/g or less in the temperature programmed desorption method including measuring a carbon monoxide desorption amount and a carbon dioxide desorption amount in the temperature range from 25° C. to 1,200° C.

4. A carbon catalyst comprising
a carrier comprising a carbon structure that has a crystallite size Lc falling within a range of 0.80 nm or more and 1.20 nm or less calculated through use of a Bragg angle of a diffraction peak $f_{broad}$ at a diffraction angle 2θ of 24.0°±4.0° obtained by separating a diffraction peak in a vicinity of a diffraction angle 2θ of 26° in an X-ray diffraction pattern obtained by powder X-ray diffraction using a CuKα ray, and that exhibits:
a carbon monoxide desorption amount in the temperature range from 650° C. to 1,200° C. of 545 µmol/g or less in a temperature programmed desorption method including measuring a carbon monoxide desorption amount in the temperature range from 25° C. to 1,200° C., and
an $I_v$ to $I_g$ ratio of 0.30 or more and 0.49 or less, wherein $I_v$ is a minimum intensity in a Raman spectrum obtained by Raman spectroscopy between 1,580 cm$^{-1}$ and 1,360 cm$^{-1}$, and $I_g$ is an intensity in a vicinity of 1,580 cm$^{-1}$ in the Raman spectrum, and
one or more metals selected from the group consisting of platinum, ruthenium, rhodium, palladium, iridium, gold and osmium carried on the carrier.

5. The carbon catalyst according to claim 1, wherein the carrier comprises the carbon structure that exhibits a carbon monoxide desorption amount in the temperature range from 650° C. to 1,200° C. of 549 µmol/g or less in the temperature programmed desorption method including measuring a carbon monoxide desorption amount in the temperature range from 25° C. to 1,200° C.

6. The carbon catalyst according to claim 1, wherein the carrier comprises the carbon structure that exhibits a half width of a D band in a vicinity of 1,360 cm$^{-1}$ of 179 cm$^{-1}$ or less in a Raman spectrum obtained by Raman spectroscopy.

7. The carbon catalyst according to claim 1, wherein the carrier comprises the carbon structure that exhibits a half width of a G band in a vicinity of 1,580 cm$^{-1}$ of 80 cm$^{-1}$ or less in a Raman spectrum obtained by Raman spectroscopy.

8. The carbon catalyst according to claim 1, wherein the carrier comprises a metal.

9. The carbon catalyst according to claim 1, wherein the carrier comprises the carbon structure that has a specific surface area of 800 m$^2$/g or more measured by a BET method.

10. The carbon catalyst according to claim 1, wherein the carrier comprises the carbon structure that exhibits a ratio of a nitrogen atom concentration to a carbon atom concentration of 2.0% or more, the nitrogen atom concentration and the carbon atom concentration being measured by X-ray photoelectron spectroscopy.

11. The carbon catalyst according to claim 1, wherein the carrier comprises the carbon structure that exhibits a nitrogen atom content of 1.5 wt % or more measured by elemental analysis based on a combustion method.

12. The carbon catalyst according to claim 1, wherein the carrier exhibits a voltage of 0.810 V (vs. NHE) or more at a time when a reduction current of −10 µA/cm$^2$ flows in an oxygen reduction voltammogram obtained by performing sweep application of a potential through use of a rotating ring disk electrode device including a working electrode containing the carrier.

13. The carbon catalyst according to claim 1, wherein the carrier exhibits a current density of −1.0 mA/cm$^2$ or less at a time when a voltage of 0.7 V (vs. NHE) is applied in an oxygen reduction voltammogram obtained by performing sweep application of a potential through use of a rotating ring disk electrode device including a working electrode containing the carrier.

14. The carbon catalyst according to claim 1, wherein, regarding an area of a region enclosed by a curve at a time of sweep application of a potential of from 1.0 V to 0.0 V and a curve at a time of sweep application of a potential of from 0.0 V to 1.0 V in a voltammogram at a fifth cycle, the voltammogram being obtained by performing sweep application of a potential for five cycles within a range of from 0.0 V to 1.0 V (vs. NHE) through use of a rotating ring disk electrode device including a working electrode containing the carrier at each of a time of starting and a time of ending a durability test in which a state of applying a voltage of 1.2 V (vs. RHE) is kept for 10 minutes through use of the rotating ring disk electrode device, the carrier exhibits an area increase amount of 5.70×10$^{-1}$ A·sec or less, the area increase amount being obtained by subtracting the area at a time of the end of the durability test from the area at a time of the start of the durability test.

15. The carbon catalyst according to claim 1, wherein, regarding a current density (mA/cm$^2$) at a time when a voltage of 0.7 V (vs. NHE) is applied in an oxygen reduction voltammogram obtained by performing sweep application of a potential through use of a rotating ring disk electrode device including a working electrode containing the carrier at each of a time of starting and a time of ending a durability test in which a state of applying a voltage of 1.2 V (vs. RHE) is kept for 10 minutes through use of the rotating ring disk electrode device, the carrier exhibits a current density maintenance ratio of 88.0% or more, the current density maintenance ratio being obtained by multiplying a value, which is obtained by dividing the current density at a time of the end of the durability test by the current density at a time of the start of the durability test, by 100.

16. A battery electrode, comprising the carbon catalyst of claim 1.

17. A battery, comprising the battery electrode of claim 16.

* * * * *